United States Patent
Zhou et al.

(10) Patent No.: US 12,204,534 B2
(45) Date of Patent: Jan. 21, 2025

(54) TIME SERIES DATA INJECTION METHOD, TIME SERIES DATA QUERY METHOD, AND DATABASE SYSTEM

(71) Applicant: HUAWEI TECHNOLOGIES CO., LTD., Guangdong (CN)

(72) Inventors: Minqi Zhou, Shanghai (CN); Zhenghai Luo, Shanghai (CN); Yong Zhang, Shanghai (CN); Yaqi Zhao, Shenzhen (CN); Yujie Zou, Shenzhen (CN); Yuanhui Xu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 81 days.

(21) Appl. No.: 18/147,904

(22) Filed: Dec. 29, 2022

(65) Prior Publication Data

US 2023/0134030 A1    May 4, 2023

Related U.S. Application Data

(63) Continuation of application No. PCT/CN2021/099672, filed on Jun. 11, 2021.

(30) Foreign Application Priority Data

Jun. 30, 2020  (CN) .......................... 202010617592.7

(51) Int. Cl.
*G06F 16/00*     (2019.01)
*G06F 16/22*     (2019.01)
(Continued)

(52) U.S. Cl.
CPC ...... *G06F 16/2453* (2019.01); *G06F 16/2228* (2019.01); *G06F 16/24552* (2019.01); *G06F 16/2477* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 2011/0029569 A1* | 2/2011 | Ganesh | G06F 16/284 707/E17.005 |
| 2018/0329921 A1* | 11/2018 | Xue | G06F 3/064 |

(Continued)

FOREIGN PATENT DOCUMENTS

| | | |
|---|---|---|
| CN | 106326220 A | 1/2017 |
| CN | 108984542 A | 12/2018 |
| CN | 110362572 A | 10/2019 |

*Primary Examiner* — Thu Nguyet T Le
(74) *Attorney, Agent, or Firm* — WOMBLE BOND DICKINSON (US) LLP

(57) ABSTRACT

A time series data injection method is provided, including: receiving time series data, where the time series data includes at least one parameter identifying a data source that generates the time series data, an indicator indicating at least one attribute of the data source, and a timestamp indicating a time point when the indicator is generated; storing a first parameter group in a row storage format, where the first parameter group includes the at least one parameter identifying the data source that generates the time series data; and storing a second parameter group in a columnar storage format, where the second parameter group includes the indicator indicating the at least one attribute of the data source and the timestamp. In the method, the time series data is injected in a hybrid row-column storage manner.

20 Claims, 17 Drawing Sheets

(51) Int. Cl.
*G06F 16/2453* (2019.01)
*G06F 16/2455* (2019.01)
*G06F 16/2458* (2019.01)
*G06F 16/25* (2019.01)

(56) References Cited

U.S. PATENT DOCUMENTS

2019/0026329 A1* 1/2019 Gaumnitz ........... G06F 16/2477
2020/0089798 A1* 3/2020 Ganichot .............. G06F 16/254

* cited by examiner

TIME SERIES DATA INJECTION METHOD, TIME SERIES DATA QUERY METHOD, AND DATABASE SYSTEM

CROSS-REFERENCE TO RELATED APPLICATIONS

This application is a continuation of International Application No. PCT/CN2021/099672, filed on Jun. 11, 2021, which claims priority to Chinese Patent Application No. 202010617592.7, filed on Jun. 30, 2020. The disclosures of the aforementioned applications are hereby incorporated by reference in their entireties.

TECHNICAL FIELD

This application relates to the field of database technologies, and specifically, to a time series data injection method and apparatus, a time series data query method and apparatus, and a database system.

BACKGROUND

With development of various industries, there are increasing requirements for databases. Currently, there are many types of databases, such as relational databases and time series databases, and there are notable increasing requirements for the time series databases.

Data stored in a time series database is usually referred to as time series data. The time series data is usually stored by row. A series of performance indicators of a device or an event in a time point indicated by a timestamp are stored in a row. During a time series data query for some performance indicators, the query only needs to be performed on each piece of time series data from a start location, until values of the performance indicators needed by a user are found.

Current time series data injection methods by row have low storage efficiency. In addition, a query by row is inefficient and affects database performance.

SUMMARY

Embodiments of this application provide a time series data injection method and a time series data query method, to improve storage performance (for example, a storage capacity and a throughput) of a database system and query efficiency. Embodiments of this application further provide corresponding apparatuses and database systems.

According to a first aspect, this application provides a time series data injection method, including: receiving time series data, where the time series data includes at least one parameter identifying a data source that generates the time series data, an indicator indicating at least one attribute of the data source, and a timestamp, and the timestamp indicates a time point when the indicator is generated; storing a first parameter group in a row storage format, where the first parameter group includes the at least one parameter identifying the data source that generates the time series data; and storing a second parameter group in a columnar storage format, where the second parameter group includes the indicator indicating the at least one attribute of the data source and the timestamp.

The method provided in the first aspect is applied to a database system, and is applied to a time series database. The time series database stores time series data. Each piece of time series data includes a time tag. Generally, a piece of time series data includes a data source (tags), an indicator (field), and a timestamp (timestamp). In this application, the indicator indicates a value of an attribute of the data source at a time point indicated by the timestamp. The indicator changes with time, but the data source does not change with time. Therefore, for a data source, a plurality of pieces of time series data are obtained over time. The data source may also be referred to as a time series. The data source is a source that generates time series data. Parameters in the first parameter group may include a device name, a device identifier, a device Internet protocol (IP) address, and the like. In this application, "at least one" includes "one" or "more", and "a plurality of" includes "two". "A plurality of" may also be referred to as "at least two". The attribute of the data source described by the indicator may be an output power, a wind speed, a throughput, a frequency, an input/output (I/O), an idle rate, or the like. The attribute of the data source described by the indicator is related to a device type. The indicator and the timestamp are associated with each other, and different timestamps usually correspond to different indicators. In the first aspect, the at least one parameter that does not change with time and that identifies the data source that generates the time series data is stored in the row storage format, and the indicator of the attribute that changes with time and the corresponding timestamp are stored in the columnar storage format. Because the at least one parameter identifying the data source that generates the time series data does not change with time, for other time series data of the data source, the at least one parameter does not need to be repeatedly stored. Storage of the at least one parameter by row saves storage space, and improves storage performance of the database system. In addition, because the at least one parameter needs to be read during query, and the at least one parameter is stored in the row storage format, the at least one parameter can be quickly located during a query without waste of query resources. Columnar storage facilitates to quickly find an indicator of a corresponding queried attribute. Therefore, in some embodiments of this application, time series data is injected in a hybrid row-column storage manner. This improves storage performance of the database, and improves time series data query efficiency.

In a possible embodiment of the first aspect, in the foregoing operation, determining the first parameter group and the second parameter group from the time series data includes: determining a row identifier based on the first parameter group, and generating a data row based on the row identifier, the at least one indicator, and the timestamp. Correspondingly, in the foregoing operation, the storing a second parameter group in a columnar storage format includes: storing the at least one indicator included in the data row into at least one compression unit CU, where the at least one indicator is in a one-to-one correspondence with the at least one CU, and each CU in the at least one CU includes the row identifier; and storing the timestamp into a CU, where the CU storing the timestamp includes the row identifier.

In this possible embodiment, because the first parameter group is stored in the row storage format, and the second parameter group is stored in the columnar storage format, the two parameter groups of the same time series data are stored in different locations. To perform corresponding queries on the two parameter groups, the two parameter groups need to be associated by using the row identifier (tagID). The row identifier is determined based on the first parameter group. First parameter groups of all pieces of time series data of a same data source are the same. Therefore, row identifiers of all the pieces of time series data of the same data source are the same. After the row identifier is determined, for the at least one indicator and the timestamp to be stored by column, the row identifier may be added to form a new data row. For the data row, during columnar storage, an indicator is stored in a compression unit (CU), a timestamp is stored in an independent CU, and the CU storing the indicator and the CU storing the timestamp each include the row identifier. One CU stores an indicator of only one attribute or stores only a timestamp. However, one CU may store indicators that are of a same attribute in a plurality of data rows and that are at different time points indicated by different timestamps. For example, a CU stores values of wind speeds in 60 rows of a wind turbine 1, and each value of the wind speed in each row corresponds to one timestamp. It can be learned that, the row identifier can ensure that after hybrid row-column storage is performed on the time series data, data corresponding to the first parameter group in a row storage can also be found in a columnar storage, thereby ensuring data query accuracy.

In a possible embodiment of the first aspect, in the foregoing operation, the storing a first parameter group in a row storage format includes: storing the first parameter group and the row identifier in the row storage format.

In this possible time series manner, the row identifier may also be stored in the row storage. An association may be established between the row storage and the columnar storage. When the time series data is queried, the corresponding row identifier can be determined based on the first parameter group.

In a possible embodiment of the first aspect, in the foregoing operation, the determining a row identifier based on the first parameter group includes: determining an index value corresponding to the at least one parameter in the first parameter group; and querying a global cache to obtain a row identifier corresponding to the index value, where the global cache stores a correspondence between the index value and the row identifier.

In this possible embodiment, the index value is obtained based on the at least one parameter. There are a plurality of manners of obtaining the index value. For example, when the first parameter group includes one parameter, the parameter may be used as the index value. Alternatively, the parameter may be converted, for example, some values or symbols are added, to obtain the index value. If the first parameter group includes a plurality of parameters, the parameters may be concatenated together to obtain the index value. For example, if the parameters include a device name and a device IP address, the device name and the device IP address may be concatenated together to form the index value (key). Certainly, this is not limited to this manner. Alternatively, the index value may be obtained based on some parameters in the first parameter group, provided that the index value can uniquely identify a data source globally. A specific obtaining manner is not limited in this application. The global cache is a cache of the database system. If the global cache includes the index value, it indicates that time series data of the data source has been previously stored, and the row identifier corresponding to the data source has been generated. The row identifier may be determined directly according to the correspondence between the index value and the row identifier, and then hybrid row-column storage is performed on the time series data. In this possible embodiment, the correspondence between the row identifier and the index value is maintained by using the global cache. This improves time series data injection efficiency.

In a possible embodiment of the first aspect, in the foregoing operation, the determining a row identifier based on the first parameter group includes: determining an index value corresponding to the plurality of parameters in the first parameter group; and allocating the row identifier to the index value, and storing a correspondence between the index value and the row identifier into a global cache.

In this possible embodiment, if the index value is not stored in the global cache, it indicates that no data of the data source is previously stored, and a row identifier needs to be allocated, and the correspondence between the index value and the row identifier needs to be stored, to be used for subsequent time series data from the data source. In this possible embodiment, the correspondence between the row identifier and the index value is maintained by using the global cache. This improves time series data injection efficiency.

In a possible embodiment of the first aspect, the at least one CU storing the at least one indicator and the CU storing the timestamp are located in a partition corresponding to a first time range. The time point indicated by the timestamp is within the first time range.

In this possible embodiment, the first time range may be one month, one week, one day, a plurality of days, several hours, or dozens of minutes, and the first time range may be preconfigured. A specific value of the first time range is not limited in this application. A partition is a data set within the first time range. The timestamp in the data row may be used to determine a partition suitable for storing the time series data. In this way, the partition can be quickly located based on a query time during a subsequent query, thereby improving query efficiency.

In a possible embodiment of the first aspect, the partition includes a plurality of data sets. The data sets correspond to time ranges that do not completely overlap with each other. The at least one CU and the CU storing the timestamp are located in a same data set. The time point indicated by the timestamp is within a time range corresponding to the same data set.

In this possible embodiment, a same partition may further include a plurality of data sets (part), each data set corresponds to one time range, and the time range may be indicated by a minimum time point and a maximum time point in the data set. The time range of the data set is smaller than the first time range of the partition. This further improves efficiency of querying data corresponding to a row identifier.

In a possible embodiment of the first aspect, the method further includes: merging at least two data sets in the plurality of data sets to obtain a merged data set, where a second time range corresponding to the merged data set includes time ranges corresponding to the at least two data sets, and the second time range is included in the first time range; and writing the merged data set into a data storage.

In this possible embodiment, the data storage is different from the cache, and is usually a disk. A data set may be indicated by a small part. The merging (merge) at least two data sets may be understood as merging small parts into a large part. When data is written into the data storage, only a large merged data set needs to be written at a time, without frequently writing small data. This reduces time series data injection overheads and improves time series data injection performance. In addition, the second time range is usually smaller than the first time range. A search range is narrowed down by narrowing down a time range, and a query speed can be further improved.

In a possible embodiment of the first aspect, the method further includes: compressing data in a plurality of CUs in the merged data set, and compressing the plurality of CUs, to obtain a compressed merged data set. In the foregoing operation, the writing the merged data set into a data storage includes: writing the compressed merged data set into the data storage.

In this possible embodiment, the writing the merged data set into a data storage may also be referred to as "flushing". Before data is flushed to a disk, the data in the CUs is compressed, and the CUs are also compressed. A double compression mode can improve a compression ratio and further improve a throughput of the database system.

According to a second aspect, this application provides a time series data query method, including: receiving a query for time series data, where the query includes at least one parameter identifying a data source that generates the time series data and at least one column identifier, the at least one column identifier indicates at least one target column, and the at least one target column includes an indicator indicating at least one attribute of the data source; determining a row identifier corresponding to the at least one parameter; determining a plurality of CUs based on the row identifier, where each of the plurality of CUs includes the row identifier; determining at least one target CU from the plurality of CUs based on the at least one column identifier, where each target CU corresponds to one target column; and generating a query result based on the at least one target CU.

The method provided in the second aspect is applied to a database system, and is applied to a time series database. For understanding some features in the second aspect, refer to corresponding descriptions in the first aspect. Details are not described herein again. It should be noted that the at least one column identifier, the at least one target column, the indicator of the at least one attribute, and the at least one target CU are in a one-to-one correspondence. In the second aspect, the corresponding row identifier may be determined based on the at least one parameter identifying the data source that generates the time series data, to find the plurality of CUs corresponding to the row identifier in a columnar storage, and then determine a target CU from the plurality of CUs based on the column identifier. It can be learned that the target CU of the column corresponding to the column identifier can be quickly found by querying based on the at least one parameter identifying the data source that generates the time series data and the column identifier. The query result is generated and returned to a client. This improves time series data query efficiency.

In a possible embodiment of the second aspect, in the foregoing operation, the generating a query result based on the at least one target CU includes: generating the query result based on the indicator of the at least one attribute in the at least one target CU and the at least one parameter.

In this possible embodiment, the indicator of the at least one attribute in the at least one target CU and the at least one parameter may be combined into corresponding time series data based on a structure during time series data injection, and then the time series data is returned to the client.

In a possible embodiment of the second aspect, the query further includes a query time, and the method further includes:
  determining a target partition corresponding to a first time range including the query time, where the target partition includes a plurality of merged data sets; determining a first merged data set from the plurality of merged data sets, where a second time range corresponding to the first merged data set includes the query time, and the first merged data set includes a plurality of CUs; and determining a plurality of first CUs from the plurality of CUs included in the first merged data set, where a third time range corresponding to the first CU includes the query time, the first time range includes the second time range, and the second time range includes the third time range. Correspondingly, in the foregoing operation, the determining a plurality of CUs based on the row identifier includes: determining, from the plurality of first CUs, the plurality of CUs corresponding to the row identifier.

In this possible embodiment, the first time range may be preconfigured, and the second time range and the third time range each may be indicated by a minimum time value and a maximum time value in a corresponding merged data set or CU. A corresponding partition is determined based on the query time. A query range is further narrowed down to the merged data set, and then the query range is further narrowed down to the CU. The query range is narrowed down by using three levels, without searching a large amount of data for the target CU. This improves data query efficiency.

In a possible embodiment of the second aspect, in the foregoing operation, the determining a row identifier corresponding to the at least one parameter includes: determining an index value corresponding to the at least one parameter; and querying a global cache to obtain a row identifier corresponding to the index value, where the global cache stores a correspondence between the index value and the row identifier.

In a possible embodiment, the row identifier may also be determined based on a correspondence between at least one parameter in a row storage table and the row identifier.

In this possible embodiment, the row identifier may be determined based on the correspondence between the index value and the row identifier, to perform data query, thereby improving data query efficiency.

According to a third aspect, this application provides a database system, including: a coordinator node and a data node communicatively connected to the coordinator node. The coordinator node is configured to receive time series data from a client. The data node is configured to: obtain the time series data from the coordinator node (for example, receive the time series data from the coordinator node), where the time series data includes at least one parameter identifying a data source that generates the time series data, an indicator indicating at least one attribute of the data source, and a timestamp, and the timestamp indicates a time point when the indicator is generated; store a first parameter group in a row storage format, where the first parameter group includes the at least one parameter identifying the data source that generates the time series data; and store a second parameter group in a columnar storage format, where the second parameter group includes the indicator indicating the at least one attribute of the data source and the timestamp.

In a possible embodiment of the third aspect, the data node is further configured to: determine a row identifier based on the first parameter group, and generate a data row based on the row identifier, the at least one indicator, and the timestamp; store the at least one indicator included in the data row into at least one compression unit CU, where the at least one indicator is in a one-to-one correspondence with the at least one CU, and each CU in the at least one CU includes the row identifier; and store the timestamp into a CU, where the CU storing the timestamp includes the row identifier.

In a possible embodiment of the third aspect, the data node is configured to store the first parameter group and the row identifier in the row storage format.

In a possible embodiment of the third aspect, the data node is configured to: determine an index value corresponding to the at least one parameter in the first parameter group;

and query a global cache to obtain a row identifier corresponding to the index value, where the global cache stores a correspondence between the index value and the row identifier.

In a possible embodiment of the third aspect, the data node is configured to: determine an index value corresponding to the plurality of parameters in the first parameter group; and allocate the row identifier to the index value, and store a correspondence between the index value and the row identifier into a global cache.

In a possible embodiment of the third aspect, the at least one CU storing the at least one indicator and the CU storing the timestamp are located in a partition corresponding to a first time range. The time point indicated by the timestamp is within the first time range.

In a possible embodiment of the third aspect, the partition includes a plurality of data sets. The data sets correspond to time ranges that do not completely overlap with each other. The at least one CU and the CU storing the timestamp are located in a same data set. The time point indicated by the timestamp is within a time range corresponding to the same data set.

In a possible embodiment of the third aspect, the data node is further configured to: merge at least two data sets in the plurality of data sets to obtain a merged data set, where a second time range corresponding to the merged data set includes time ranges corresponding to the at least two data sets, and the second time range is included in the first time range; and writing the merged data set into a data storage.

In a possible embodiment of the third aspect, the data node is further configured to: compress data in a plurality of CUs in the merged data set, and compress the plurality of CUs, to obtain a compressed merged data set; and write the compressed merged data set into the data storage.

For understanding any one of the third aspect and the possible embodiments of the third aspect, refer to the first aspect and the corresponding possible embodiments of the first aspect.

According to a fourth aspect, this application provides a database system, including: a coordinator node and a data node communicatively connected to the coordinator node. The coordinator node is configured to receive a query for time series data from a client. The data node is configured to: obtain the query for time series data from the coordinator node, where the query includes at least one parameter identifying a data source that generates the time series data and at least one column identifier, the at least one column identifier indicates at least one target column, and the at least one target column includes an indicator indicating at least one attribute of the data source; determine a row identifier corresponding to the at least one parameter; determine a plurality of CUs based on the row identifier, where each of the plurality of CUs includes the row identifier; determine at least one target CU from the plurality of CUs based on the at least one column identifier, where each target CU corresponds to one target column; and generate a query result based on the at least one target CU.

In a possible embodiment of the fourth aspect, the data node is configured to generate the query result based on the indicator of the at least one attribute in the at least one target CU and the at least one parameter.

In a possible embodiment of the fourth aspect, the data node is further configured to: determine a target partition corresponding to a first time range including the query time, where the target partition includes a plurality of merged data sets; determine a first merged data set from the plurality of merged data sets, where a second time range corresponding to the first merged data set includes the query time, and the first merged data set includes a plurality of CUs; determine a plurality of first CUs from the plurality of CUs included in the first merged data set, where a third time range corresponding to the first CU includes the query time, the first time range includes the second time range, and the second time range includes the third time range; and determine, from the plurality of first CUs, the plurality of CUs corresponding to the row identifier.

In a possible embodiment of the fourth aspect, the data node is configured to: determine an index value corresponding to the at least one parameter; and query a global cache to obtain a row identifier corresponding to the index value, where the global cache stores a correspondence between the index value and the row identifier.

For understanding any one of the fourth aspect and the possible embodiments of the fourth aspect, refer to the second aspect and the corresponding possible embodiments of the second aspect.

According to a fifth aspect of this application, a time series data injection apparatus is provided. The apparatus includes a module or a unit configured to perform the method according to any one of the first aspect or the possible embodiments of the first aspect, for example, a receiving unit, a determining unit, and a processing unit. It should be noted that the determining unit and the processing unit may be implemented by using one processing unit.

According to a sixth aspect of this application, a time series data query apparatus is provided. The apparatus includes a module or a unit configured to perform the method according to any one of the second aspect or the possible embodiments of the second aspect, for example, a receiving unit, a first processing unit, a second processing unit, and a third processing unit. It should be noted that functions performed by the three processing units may also be implemented by using one or two processing units.

According to a seventh aspect of this application, a time series data injection apparatus is provided. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method in any one of the first aspect or the possible embodiments of the first aspect.

According to an eighth aspect of this application, a time series data query apparatus is provided. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method in any one of the second aspect or the possible embodiments of the second aspect.

According to a ninth aspect of this application, a computer-readable storage medium is provided. A program is stored in the computer-readable storage medium. The program enables a processor to perform the time series data injection method in any one of the first aspect and the embodiments of the first aspect.

According to a tenth aspect of this application, a computer-readable storage medium is provided. A program is stored in the computer-readable storage medium. The program enables a processor to perform the time series data query method in any one of the second aspect and the embodiments of the second aspect.

According to an eleventh aspect of this application, a computer program product is provided. The computer program product includes computer-executable instructions. The computer-executable instructions are stored in a computer-readable storage medium. At least one processor of a device may read the computer-executable instructions from the computer-readable storage medium. When the at least one processor executes the computer-executable instructions, the device is enabled to implement the time series data injection method in any one of the first aspect and the possible embodiments of the first aspect.

According to a twelfth aspect of this application, a computer program product is provided. The computer program product includes computer-executable instructions. The computer-executable instructions are stored in a computer-readable storage medium. At least one processor of a device may read the computer-executable instructions from the computer-readable storage medium. When the at least one processor executes the computer-executable instructions, the device is enabled to implement the time series data query method in any one of the second aspect and the possible embodiments of the second aspect.

According to a thirteenth aspect, this application provides a chip system. The chip system includes a processor, configured to support a time series data injection apparatus in implementing functions in any one of the first aspect or the possible embodiments of the first aspect. In a possible design, the chip system may further include a memory. The memory is configured to store program instructions and data that are utilized by the time series data injection apparatus. The chip system may include a chip, or may include a chip and another discrete component.

According to a fourteenth aspect, this application provides a chip system. The chip system includes a processor, configured to support a time series data query apparatus in implementing functions in any one of the second aspect or the possible embodiments of the second aspect. In a possible design, the chip system may further include a memory. The memory is configured to store program instructions and data that are utilized by the time series data query apparatus. The chip system may include a chip, or may include a chip and another discrete component.

It may be understood that any one of the time series data injection apparatus, time series data query apparatus, computer storage medium, or computer program product provided above is configured to perform the corresponding time series data injection method and time series data query method provided above. Therefore, for beneficial effect that can be achieved by the time series data injection apparatus, time series data query apparatus, computer storage medium, or computer program product, refer to beneficial effect in the corresponding method provided above. Details are not described herein again.

DESCRIPTION OF EMBODIMENTS

The following describes embodiments of this application with reference to the accompanying drawings. It is clear that the described embodiments are merely some but not all of embodiments of this application. Persons of ordinary skill in the art may learn that, with technology development and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments described herein can be implemented in an order other than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

Embodiments of this application provide a time series data injection method and a time series data query method, to improve storage performance (for example, a storage capacity and a throughput) of a database system and query efficiency. Embodiments of this application further provide corresponding apparatuses and database systems. Details are separately described in the following.

Figure 1A:
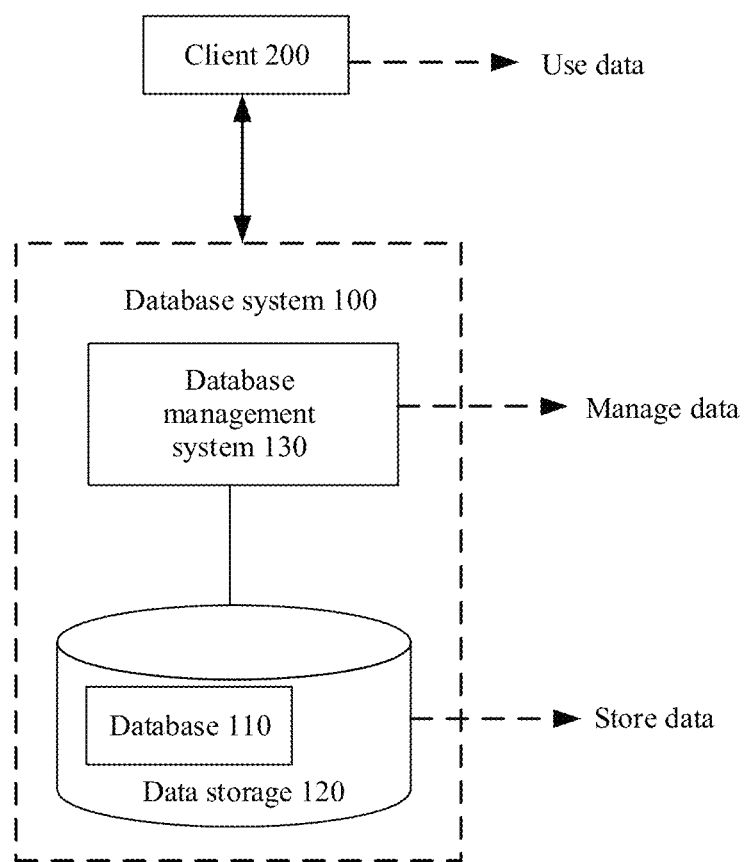
FIG. 1A is a schematic diagram of an architecture of a database system.

The method provided in embodiments of this application may be applied to a database system. FIG. 1A shows a typical logical architecture of a database system. According to FIG. 1A, the database system 100 includes a database 110 and a database management system (DBMS) 130.

The database 110 is an organized data set stored in a data storage 120, that is, an associated data set organized, stored, and used based on a particular data model. Based on different data models used for organizing data, the data may be divided into a plurality of types, for example, relational data, graph data, and time series data. The relational data is data modeled by using a relational model, and is usually represented as a table, where a row in the table represents a set of associated values of an object or entity. The graph data, "graph" for short, is used to represent a relationship, for example, a social relationship, between objects or entities. The time series data is a data column recorded and indexed in a time sequence, and is used to describe status change information of an object in a time dimension.

The database management system 130 is a core of the database system, and is system software used to organize, store, and maintain data. A client 200 may access the database 110 by using the database management system 130, and a database administrator also maintains the database by using the database management system. The database management system 130 provides various functions for the client 200 to establish, modify, and query the database, where the client 200 may be an application or user equipment. The functions provided by the database management system 130 may include but are not limited to the following items: (1) Data definition function: The database management system 130 provides a data definition language (DDL) to define a structure of the database 110, where the DDL is used to depict a database framework, and may be stored in a data dictionary. (2) Data access function: The database management system 130 provides a data manipulation language (DML) to implement basic access operations on the database 110, for example, retrieval, insertion, modification, and deletion. (3) Database operation management function: The database management system 130 provides a data control function to effectively control and manage operation of the database 110, to ensure correct and effective data. (4) Database establishment and maintenance functions: includes functions such as loading of initial data of the database, dump, restoration, and reorganization of the database, and monitoring and analysis of system performance. (5) Transmission of the database: The database management system provides transmission of processed data, to implement communication between the client and the database management system, and the database management system usually coordinates with an operating system to complete the transmission of the processed data.

The data storage 120 includes but is not limited to a solid state drive (SSD), a disk array, a cloud storage, or non-transitory computer-readable storage medium of another type. A person skilled in the art may understand that a database system may include components more or less than those shown in FIG. 1A, or include components different from those shown in FIG. 1A. FIG. 1A merely shows components more related to embodiments of this application.

The database system provided in this embodiment of this application may be a distributed database system (DDBS). It may be a database system with a massively parallel processing (MPP) architecture. The database system with the MPP structure is also a DDBS. The following describes the DDBS with reference to FIG. 1B and FIG. 1C.

Figure 1B:
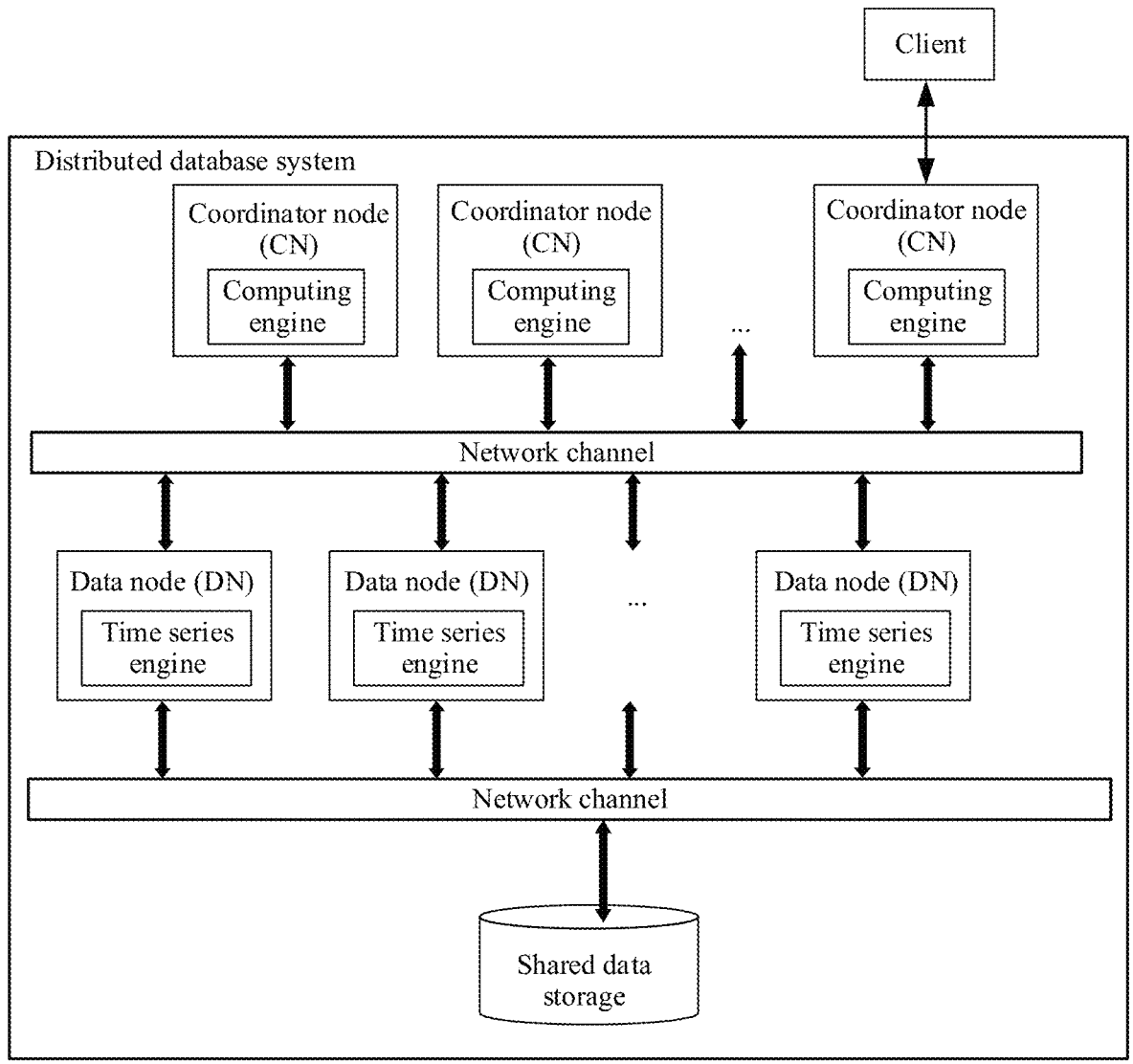
FIG. 1B is a schematic diagram of an architecture of a distributed database system according to an embodiment of this application.

FIG. 1B is a schematic diagram of a distributed database system with a shared-storage architecture, including one or more coordinator nodes (CN) and a plurality of data nodes (DN). The DDBS may further include another device, for example, a global transaction manager (GTM). The CN and the DN communicate with each other through a network channel. The DN may include a time series engine, and the time series engine may implement functions related to time series data, such as time series data injection and time series data query. The CN may include a computing engine. The computing engine may determine an execution plan for a query, and then distribute the query to a corresponding DN for execution. In an embodiment, the network channel may include network devices such as a switch, a router, and a gateway. The CN and DN work together to perform the functions of the database management system and provide services such as database retrieval, insertion, modification, and deletion for the client. In an embodiment, a database management system is deployed on each CN and DN. A shared data storage stores data that can be shared by a plurality of DNs. The DNs can read and write data from and into the data storage through a network channel. The shared data storage may be a shared disk array. The CN and DN in the distributed database system may be physical machines, such as database servers, or may be virtual machines (VM) or containers running on abstract hardware resources. In an embodiment, the CN and the DN are virtual machines or containers, the network channel is a virtual switching network, and the virtual switching network includes a virtual switch. The database management systems deployed on the CN and DN are DBMS instances. The DBMS instance may be a process or a thread. These DBMSs work together to perform functions of a database relational system. In another embodiment, the CN and the DN are physical machines, and the network channel includes one or more switches. The switch is a storage area network (SAN) switch, an Ethernet switch, a fiber channel switch, or another physical switching device.

Figure 1C:
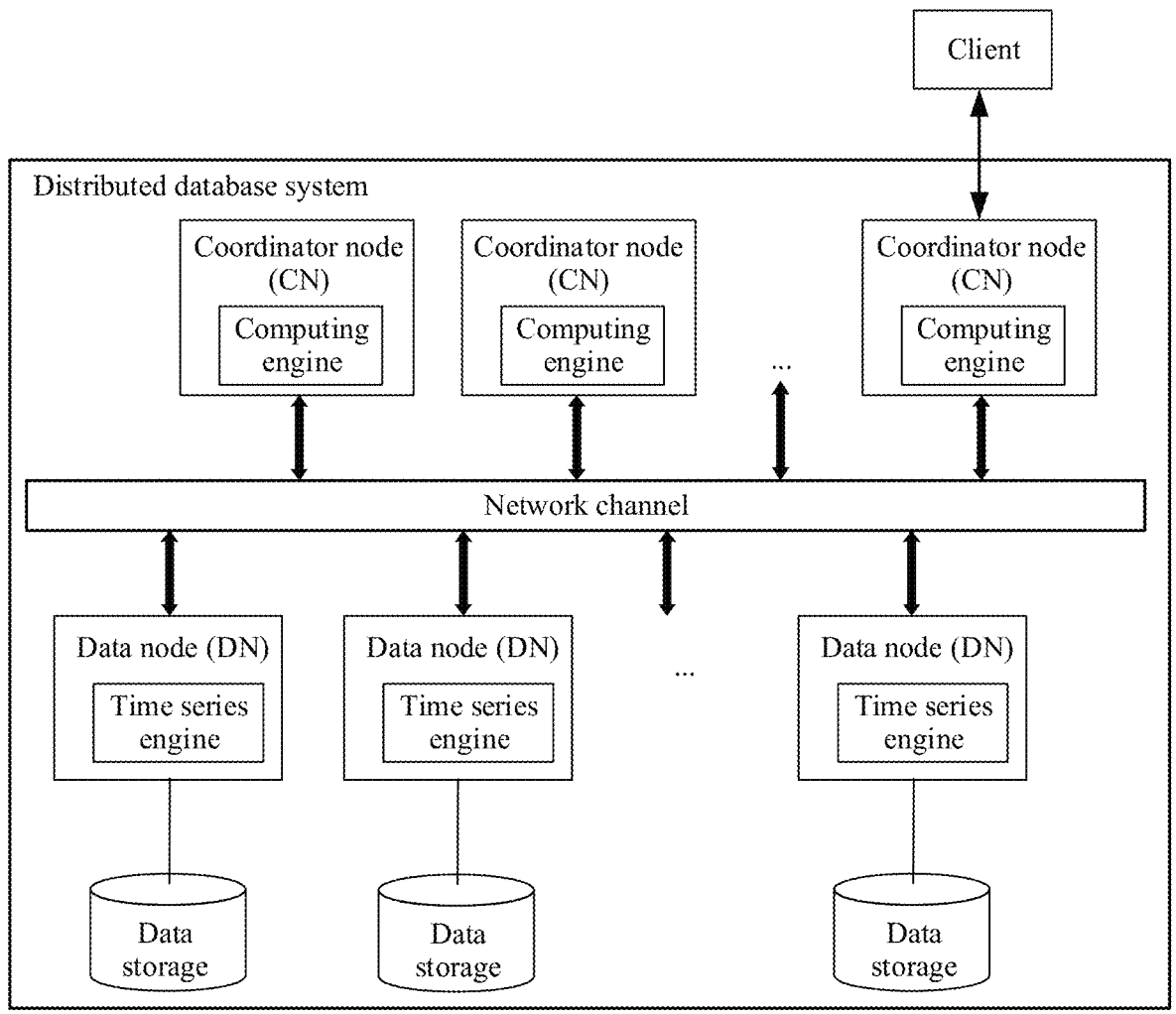
FIG. 1C is a schematic diagram of another architecture of a distributed database system according to an embodiment of this application.

FIG. 1C is a schematic diagram of a distributed database system with a shared-nothing architecture. Each DN has a dedicated hardware resource (such as a data storage), an operating system, and a database. CNs and DNs communicate with each other through a network channel. For understanding the network channel, refer to the corresponding description in FIG. 1B. In the system, data is distributed to the DNs based on a database model and an application characteristic. A query task is divided by CNs into several parts, to be executed concurrently on all the DNs. All the nodes perform calculation coordinately and are used as a whole to provide a database service. All communication functions are implemented on a high-bandwidth network interconnection system. Similar to those in the distributed database system with the shared-storage architecture described in FIG. 1B, the CNs and DNs herein may be physical machines or virtual machines.

In all the embodiments of this application, the data storage of the database system includes but is not limited to a solid state drive (SSD), a disk array, or a non-transitory computer-readable medium of another type. Although a database is not shown in FIG. 1B to FIG. 1C, it should be understood that the database is stored in the data storage. A person skilled in the art may understand that a database system may include components more or less than those shown in FIG. 1A to FIG. 1C, or include components different from those shown in FIG. 1A to FIG. 1C. FIG. 1A to FIG. 1C merely show components more related to embodiments of this application. However, a person skilled in the art may understand that a distributed database system may include any quantities of CNs and DNs. Database management system functions of CNs and DNs may be separately implemented by using an appropriate combination of software, hardware, and/or firmware on the CNs and DNs.

Figure 2:
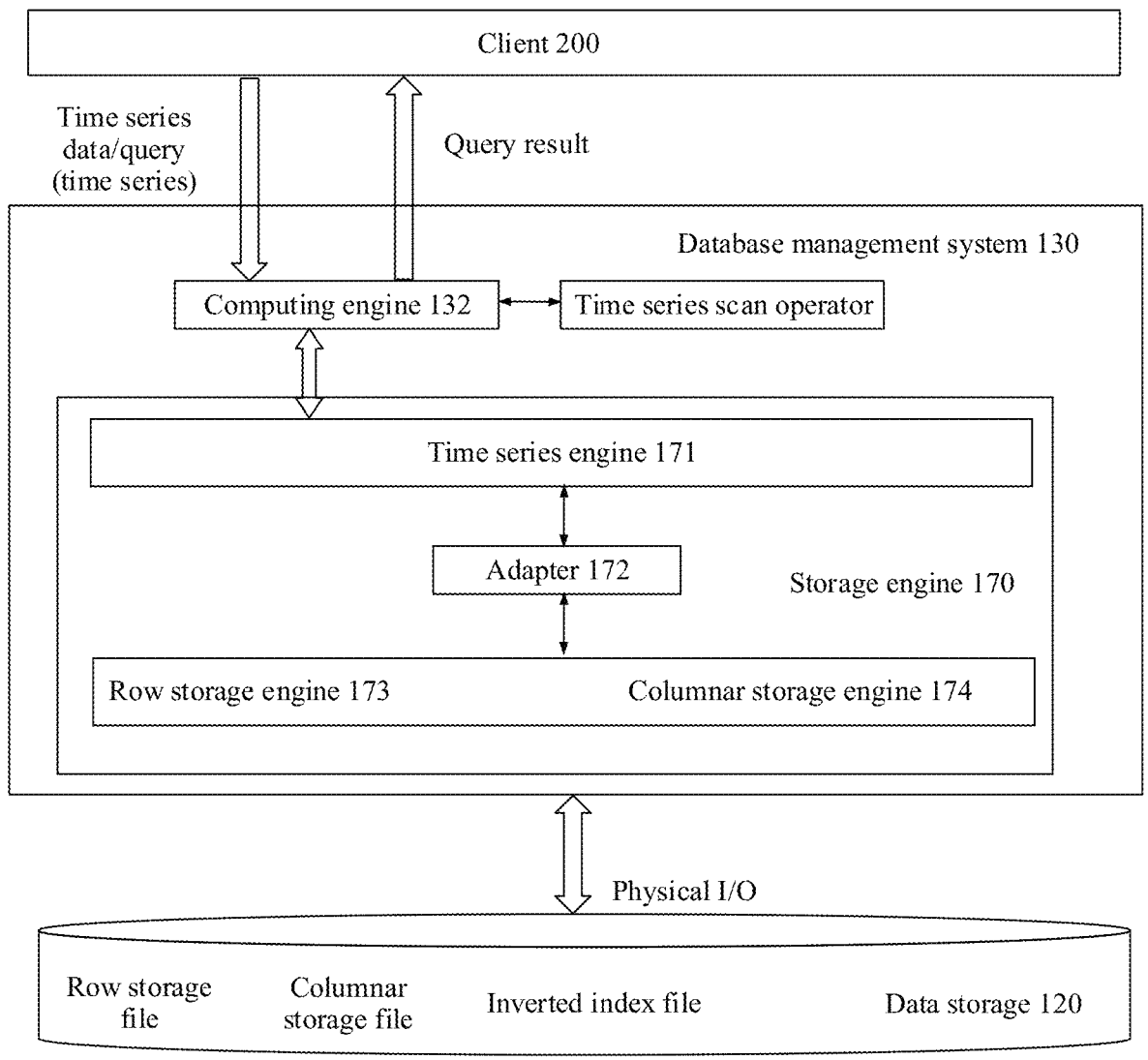
FIG. 2 is a schematic diagram of still another architecture of a distributed database system according to an embodiment of this application.

The database systems in FIG. 1B and FIG. 1C respectively show the computing engine and the time series engine. In embodiments of this application, for understanding functions of the computing engine and the time series engine, refer to FIG. 2. A DBMS 130 in a database system shown in FIG. 2 includes a storage engine 170 and a computing engine 132.

The computing engine 132 supports at least one type of query language, such as a structured query language (SQL) and another query language that supports time series data. A main function of the computing engine 132 is to generate a corresponding execution plan based on a query submitted by a client 200, and perform a data operation according to the execution plan, to generate a query result. For the database system of a time series database, the computing engine mainly includes a query engine and an execution engine. The query engine mainly completes query parsing, query rewriting, and execution plan generation. The execution engine includes an operator and a related execution environment. Common operators include scan, hash join, aggregate, and the like. The execution environment mainly includes an execution framework and a resource manager.

The storage engine 170 provides, in a file system, the computing engine with an interface for accessing data, and provides index management, and management of data such as a cache, a transaction, and a log during runtime. For example, the storage engine 170 may write an execution result of the computing engine 132 into the data storage 120 by using a physical I/O.

The storage engine 170 includes a time series engine 171, an adapter 172, a row storage engine 173, and a columnar storage engine 174. The time series engine 171 manages time series data. The adapter 172 provides an interface between the time series engine 171, row storage engine 173, and columnar storage engine 174. It adapts to the row storage engine 173 or columnar storage engine 174 based on a parameter type in different parts of the time series data. The row storage engine 173 stores time series data in a row storage format, and the columnar storage engine 174 stores time series data in a columnar storage format.

The computing engine 132 and the storage engine 170 are used during time series data query, and the storage engine 170 is used during time series data injection.

When time series data is injected, the time series engine 171 splits the time series data. Then, the row storage engine 173 stores a part that is in the time series data and that needs to be stored by row in the row storage format. The columnar storage engine 174 stores a part that is in the time series data and that needs to be stored by column in the columnar storage format.

When the time series data is queried, the computing engine 132 receives a query from the client 200 (the query is also referred to as a "query statement" or "statement" in some scenarios), analyzes the query, and establishes a time series scan operator. The time series engine 171 starts data scanning after receiving an analysis result of the computing engine 132. The time series engine 171 implements time series data query in a hybrid row-column scanning mode. The computing engine 132 receives time series data returned by the time series engine 171, that is, a query result, and returns the query result to the client 200.

The data storage 120 includes a row storage file, a columnar storage file, and an inverted index file. The row storage file includes time series data stored in the row storage format, the columnar storage file includes time series data stored in the columnar storage format, and the inverted index file includes a correspondence between an index value and a row identifier. The row identifier may be searched for based on the index value. The index value may be understood as an inverted index, and a file that includes the inverted index is referred to as the inverted index file.

Based on the distributed database system described above, the following describes a time series data injection method and a time series data query method respectively.

For ease of understanding, it is noted in advance that in embodiments of this application, "at least one" includes "one" or "more", and "a plurality of" includes "two". "A plurality of" may also be referred to as "at least two".

Figure 3:
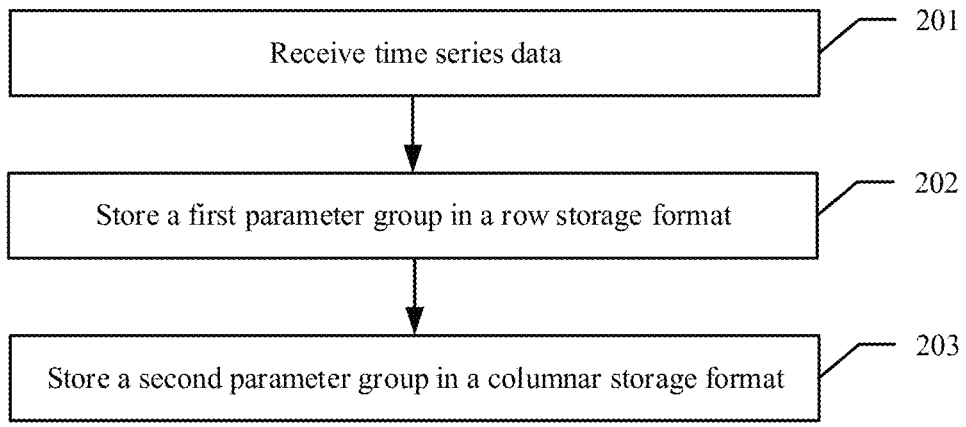
FIG. 3 is a schematic diagram of an embodiment of a time series data injection method according to an embodiment of this application.

FIG. 3 is a schematic diagram of an embodiment of a time series data injection method according to an embodiment of this application.

As shown in FIG. 3, the embodiment of the time series data injection method according to this embodiment of this application includes the following operations.

201: Receive time series data.

The time series data includes at least one parameter identifying a data source that generates the time series data, an indicator indicating at least one attribute of the data source, and a timestamp. The timestamp indicates a time point when the indicator is generated.

It may be understood that a first parameter group and a second parameter group may be logical division of parameters, indicators, and timestamps included in the time series data.

The time series database stores time series data. Each piece of time series data includes a time tag. Generally, a piece of time series data includes a data source (tags), an indicator (field), and a timestamp (timestamp). In this application, the indicator indicates a value of an attribute of the data source at a time point indicated by the timestamp. The indicator changes with time, but the data source does not change with time. Therefore, for a data source, a plurality of pieces of time series data are obtained over time. The data source may also be referred to as a time series. The data source is a source that generates time series data. Parameters in the first parameter group may include a device name, a device identifier, a device Internet protocol (IP) address, and the like. The attribute of the data source described by the indicator may be an output power, a wind speed, a throughput, a frequency, an input/output (I/O), an idle rate, or the like. The attribute of the data source described by the indicator is related to a device type. The indicator and the timestamp are associated with each other, and different timestamps usually correspond to different indicators.

For understanding the time series data, see Table 1.

TABLE 1

Time series data

| Device name | Device IP address | I/O | Idle rate | Timestamp |
|---|---|---|---|---|
| ombi | 10.73.73.3 | 21.15% | 94.5% | Mar. 7, 2020 12:01:01 |
| sds | 10.93.19.141 | 1% | 99% | Mar. 7, 2020 12:01:01 |
| sds | 10.93.20.138 | 5% | 98.9% | Mar. 7, 2020 12:01:01 |
| nsp | 10.1.142.176 | 0.8% | 91% | Mar. 7, 2020 12:01:01 |

As shown in Table 1, Table 1 includes four pieces of time series data, and each row is one piece of time series data. The first two columns in Table 1 may be understood as data sources (tags) of time series data, or tags may be referred to as a time series. The I/O and idle rate (idle) are two attributes of the data source. Values in the I/O column and values in the idle rate column are indicators. The fifth column of timestamp indicates a time point when an indicator in a same row is obtained.

In addition, it should be noted that one device may be a plurality of data sources. For example, if a device has a same name but different IP addresses, the device represents two different data sources. In the second and third lines in Table 1, the device names are the same, that is, sds, but the device IP addresses are different. Therefore, the time series data in the second line and the time series data in the third line are from different data sources. Different time series data comes from a same data source only when all parameters in the first parameter group are the same.

202: Store the first parameter group in a row storage format.

The first parameter group includes the at least one parameter identifying the data source that generates the time series data. As shown in Table 1, the device name and the device IP address may be grouped into the first parameter group.

203: Store the second parameter group in a columnar storage format.

The second parameter group includes the indicator indicating the at least one attribute of the data source and the timestamp. For example, in Table 1, the I/O, the idle rate, and the timestamp may be grouped into the second parameter group.

In a possible embodiment, before the time series data is stored, the time series data may be further split, and the at least one parameter identifying the data source that generates the time series data is separated from the indicator indicating the at least one attribute of the data source and the timestamp.

In this embodiment of this application, the at least one parameter that does not change with time and that identifies the data source that generates the time series data is stored in the row storage format, and the indicator of the attribute that changes with time and the corresponding timestamp are stored in the columnar storage format. Because the at least one parameter identifying the data source that generates the time series data does not change with time, for other time series data of the data source, the at least one parameter does not need to be repeatedly stored. Storage of the at least one parameter by row saves storage space, and improves storage performance of the database system. In addition, because the at least one parameter needs to be read during query, and the at least one parameter is stored in the row storage format, the at least one parameter can be quickly located during a query without waste of query resources. Columnar storage facilitates to quickly find an indicator of a corresponding queried attribute. Therefore, in some embodiments of this application, time series data is injected in a hybrid row-column storage manner. This improves storage performance of the database, and improves time series data query efficiency.

This application may include the following two time series data injection solutions: 1. Splitting of hybrid row-column storage. 2. Two-layer caching of a columnar storage part.

1. Splitting of Hybrid Row-Column Storage

Figure 4:
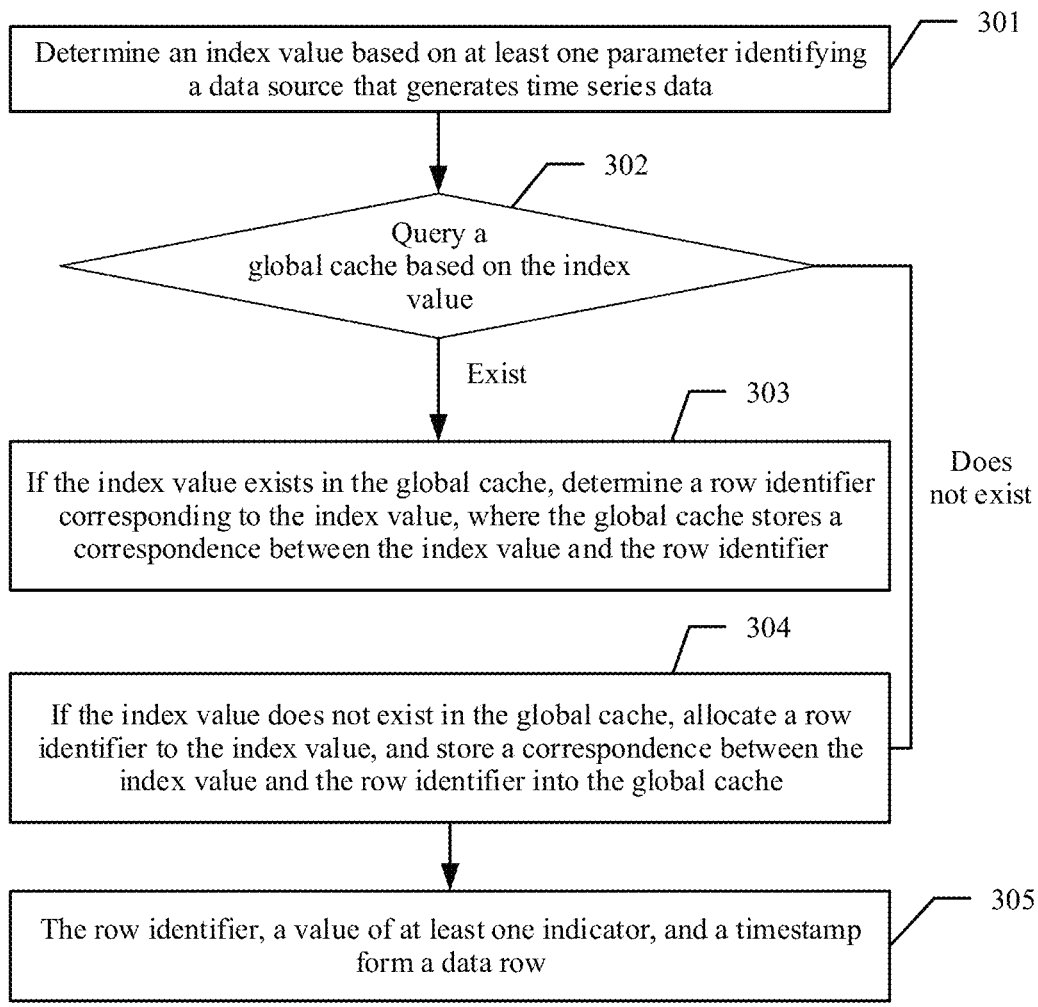
FIG. 4 is a schematic diagram of another embodiment of a time series data injection method according to an embodiment of this application.

For understanding the process, refer to FIG. 4. As shown in FIG. 4, splitting of hybrid row-column storage on the time series data includes the following operations.

301: Determine an index value based on the at least one parameter identifying the data source that generates the time series data.

The index value is obtained based on the at least one parameter. There are a plurality of manners of obtaining the index value. For example, when there is one parameter, the parameter may be used as the index value. Alternatively, the parameter may be converted, for example, some values or symbols are added, to obtain the index value. When there are a plurality of parameters, the parameters may be concatenated together to obtain the index value. For example, if the plurality of parameters include a device name and a device IP address, the device name and the device IP address may be concatenated together to form the index value (key). Certainly, this is not limited to this manner. Alternatively, the index value may be obtained based on some parameters in the plurality of parameters, provided that the index value can uniquely identify a data source globally. A specific obtaining manner is not limited in this application.

302: Query a global cache based on the index value. If the index value exists, operation 303 is performed. If the index value does not exist, operation 304 is performed.

The global cache is a cache of the database system.

303: If the index value exists in the global cache, determine a row identifier corresponding to the index value, where the global cache stores a correspondence between the index value and the row identifier.

The row identifier (tagID) may be represented by a value such as 1, 2, or 3, or may be represented by a character such as a, b, c, or d. The row identifier is not limited to the two representation manners, and may be represented in another form, provided that each row identifier can uniquely identify one data source.

The correspondence between the index value and the row identifier may be maintained in a table manner, or may be maintained in another mapping manner.

304: If the index value does not exist in the global cache, allocate a row identifier to the index value, and store a correspondence between the index value and the row identifier into the global cache.

305: The row identifier, a value of the at least one indicator, and the timestamp form a data row.

After the row identifier is determined, a correspondence between the first parameter group and the row identifier may be established, and then a correspondence between the second parameter group and the row identifier is established.

The correspondence between the first parameter group and the row identifier may be indicated in a form shown in Table 2 with reference to the time series data in Table 1.

TABLE 2

Data of a row storage part

| Device name | Device IP address | Row identifier |
|---|---|---|
| ombi | 10.73.73.3 | 1 |
| sds | 10.93.19.141 | 2 |
| sds | 10.93.20.138 | 3 |
| nsp | 10.1.142.176 | 4 |

The correspondence between the second parameter group and the row identifier may be indicated in a form shown in Table 3 with reference to the time series data in Table 1.

TABLE 3

Data of a columnar storage part

| I/O | Idle rate | Timestamp | Row identifier |
|---|---|---|---|
| 21.15% | 94.5% | Mar. 7, 2020 12:01:01 | 1 |
| 1% | 99% | Mar. 7, 2020 12:01:01 | 2 |
| 5% | 98.9% | Mar. 7, 2020 12:01:01 | 3 |
| 0.8% | 91% | Mar. 7, 2020 12:01:01 | 4 |

Each row in Table 3 may be referred to as a data row.

In the foregoing process, the splitting of hybrid row-column storage on the time series data is performed. For example, four pieces of time series data in Table 1 are split into the forms in Table 2 and Table 3 according to the foregoing described principles. For example, the device name, the device IP address, and the row identifier are stored in the row storage format in Table 2. The columnar storage part may be flushed to a disk through two-layer caching. Flushing indicates writing data into a data storage. The following describes the process of two-layer caching.

In some embodiments of this application, the correspondence between the row identifier and the index value is maintained by using the global cache. This improves time series data injection efficiency.

2. Two-Layer Caching of a Columnar Storage Part

Figure 5A:
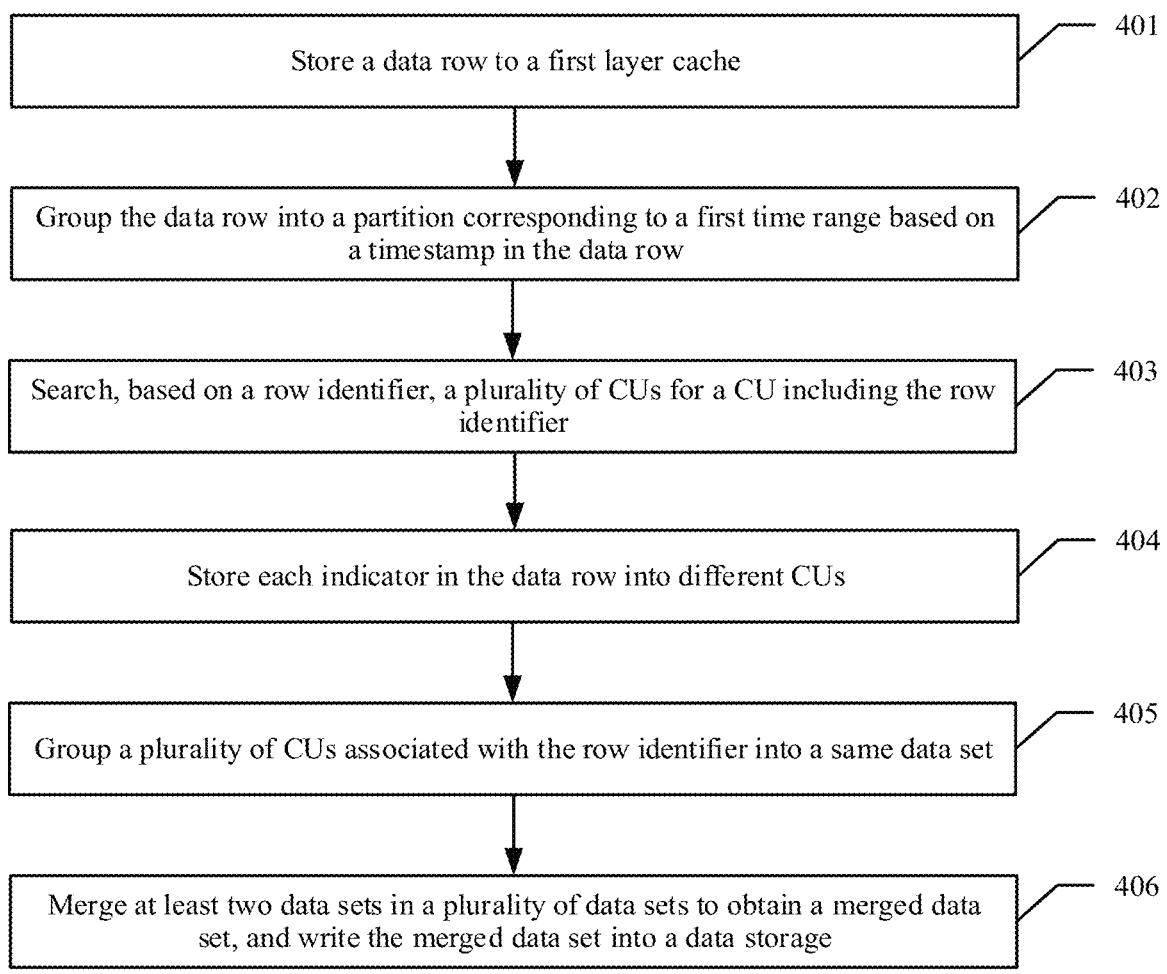
FIG. 5A is a schematic diagram of still another embodiment of a time series data injection method according to an embodiment of this application.

For understanding a process of two-layer caching of the columnar storage part, refer to FIG. 5A.

As shown in FIG. 5A, the process includes the following operations.

401: Store a data row to a first layer cache.

If the first layer cache is not full and a timer refresh time point is not reached, the process ends. If the first layer cache is full, or the timer refresh time point is reached, operation 402 may be performed. Operation 402 may be directly performed without waiting until the first layer cache is full or the timer refresh time point is reached, but a waiting manner reduces I/O overheads.

The first layer cache may be a global cache.

402: Group the data row into a partition corresponding to a first time range based on a timestamp in the data row.

At least one CU storing at least one indicator and CU storing the timestamp are located in the partition corresponding to the first time range. A time point indicated by the timestamp is within the first time range.

The first time range may be one month, one week, one day, a plurality of days, several hours, or dozens of minutes, and the first time range may be preconfigured. A specific value of the first time range is not limited in this application. The partition is a data set corresponding to the first time range. The timestamp in the data row may be used to determine a partition suitable for storing the time series data.

In this way, the partition can be quickly located based on a query time during a subsequent query, thereby improving query efficiency.

The partition includes a plurality of compression units (CU). During columnar storage, indicators of a same attribute at different time points may be stored in one CU, and timestamps are stored in an independent CU. Then, an association between a plurality of CUs of the same data source is established based on a row identifier. The association may be that each CU storing the indicator in the data row and the CU storing the timestamp include the row identifier. One CU stores only one column of data, but may store indicators of a same attribute in a plurality of data rows. For example, one CU stores indicators of I/Os in Table 3 at different time points.

Figure 5B:
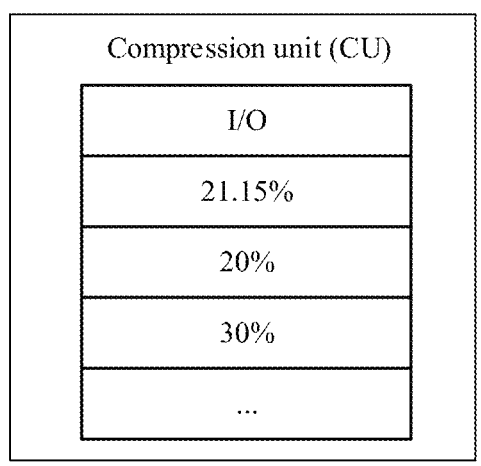
FIG. 5B is a schematic diagram of an example of a compression unit according to an embodiment of this application.

Data stored in a CU may be understood with reference to FIG. 5B. As shown in FIG. 5B, the CU stores an indicator of an I/O column whose tagID=1.

Figure 5C:
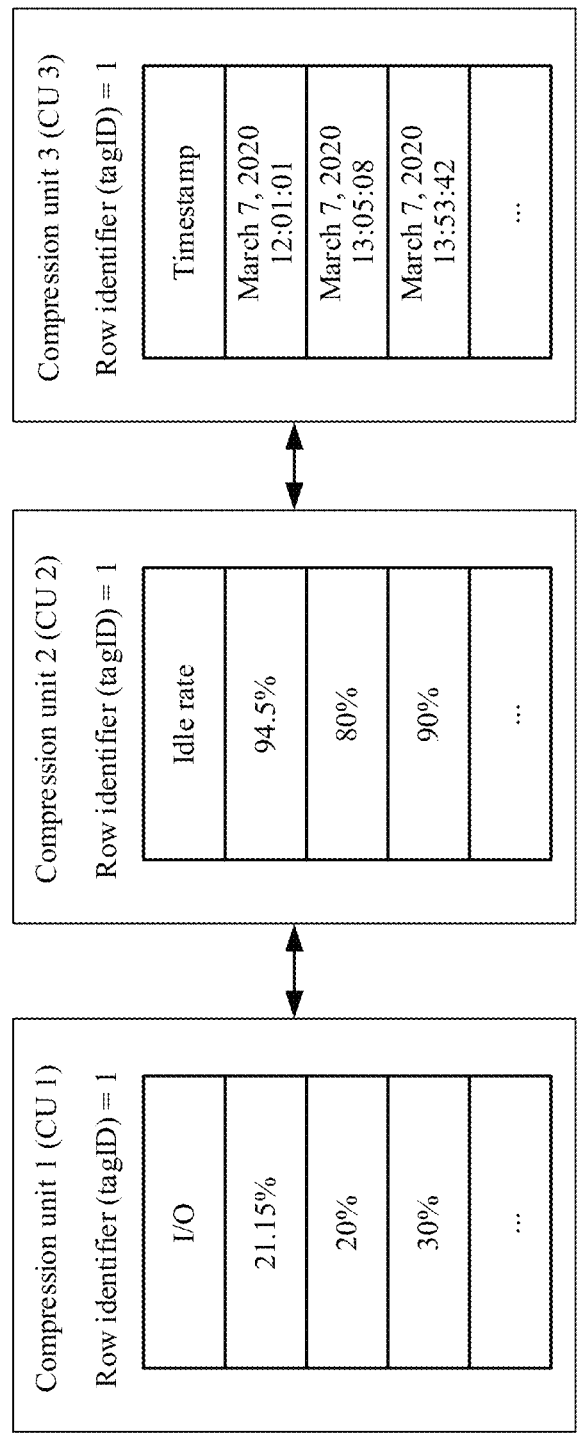
FIG. 5C is a schematic diagram of an example scenario according to an embodiment of this application.

For understanding an association between CUs of a same tagID, refer to FIG. 5C. As shown in FIG. 5C, a CU 1 stores an indicator of an I/O whose tagID=1. A CU 2 stores an indicator of an idle rate whose tagID=1, and a CU 3 stores data of a timestamp whose tagID=1.

The timestamp in the data row may be used to determine a partition suitable for storing the time series data. In this way, the partition can be quickly located based on a query time during a subsequent query, thereby improving query efficiency.

403: Search, based on the row identifier, the plurality of CUs for a CU including the row identifier.

If the row identifier is 1, the CU 1, the CU 2, and the CU 3 may be found.

404: Store each indicator in the data row into different CUs.

If an I/O of the data row is 35%, an idle rate is 92%, and a timestamp is Mar. 7, 2020 14:15:23, a value of each column of the data row is separately stored on the CU 1, the CU 2, and the CU 3. After the value is added, for understanding data in the CU 1, the CU 2, and the CU 3, refer to FIG. 5D.

405: Group a plurality of CUs associated with the row identifier into a same data set, and the data set (a small part) may also be understood as a second layer cache.

The partition includes a plurality of data sets. The data sets correspond to time ranges that do not completely overlap with each other. The at least one CU and the CU storing the timestamp are located in a same data set. The time point indicated by the timestamp is within a time range corresponding to the same data set. The time range may be indicated by a minimum time point and a maximum time point in the data set.

The data set is a set of CUs at the lower level of the partition. For understanding a relationship between a small part and a CU, refer to FIG. 5E. Each small part shown in FIG. 5E includes CU description information, and the CU description information records a time range of each CU and information about a corresponding tagID.

In a same partition, CUs including a same row identifier may be further grouped into a same data set (part). This further improves search efficiency of querying a CU corresponding to a row identifier.

406: Merge at least two data sets in the plurality of data sets to obtain a merged data set, and write the merged data set into a data storage.

The data storage is another storage medium different from the global cache, for example, a disk.

A second time range corresponding to the merged data set includes time ranges corresponding to the at least two data sets, and the second time range is included in the first time range.

This process may also be understood as merging small parts into a large part. As shown in FIG. 5F, a small part 1 and a small part 2 are merged into a large part 1. When data is written into the data storage, only a large merged data set needs to be written at a time, without frequently writing small data. This reduces time series data injection overheads and improves time series data injection performance. In addition, the second time range is usually smaller than the first time range. A search range is narrowed down by narrowing down a time range, and a query speed can be further improved.

Figure 5E:
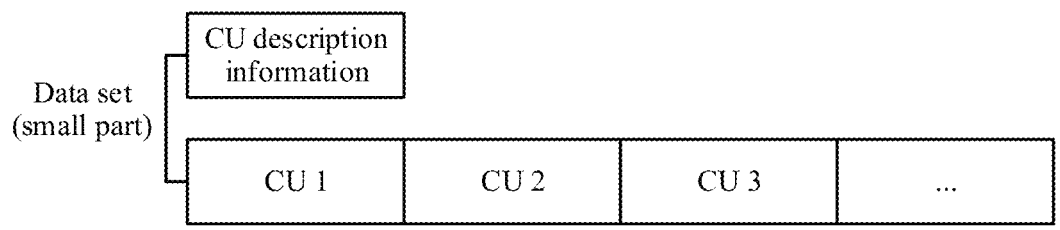
FIG. 5E is a schematic diagram of still another example scenario according to an embodiment of this application.
Figure 5F:
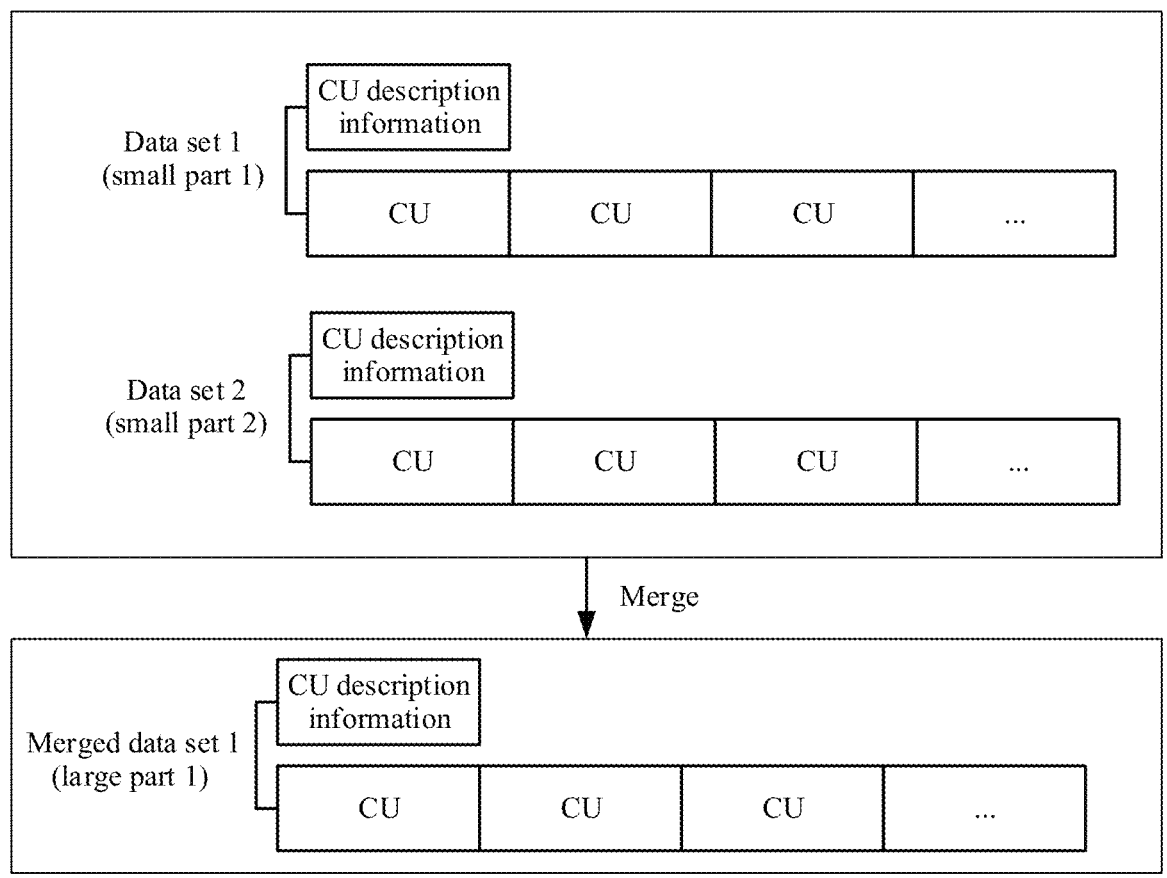
FIG. 5F is a schematic diagram of yet another example scenario according to an embodiment of this application.
Figure 6:
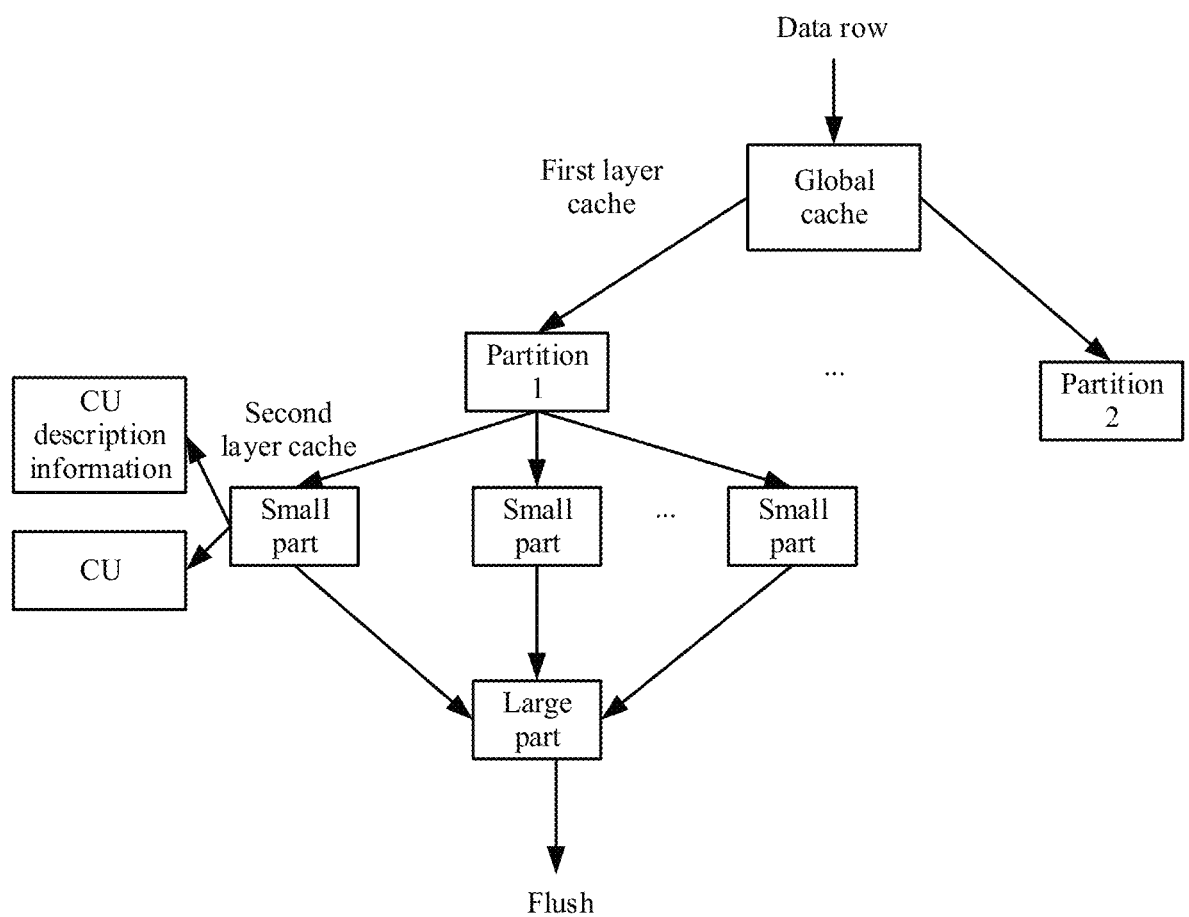
FIG. 6 is a schematic diagram of still yet another example scenario according to an embodiment of this application.

For understanding the foregoing two-layer caching of the data row, refer to the scenario shown in FIG. 6. As shown in FIG. 6, the process includes: storing the data row into the global cache. The global cache includes a plurality of partitions, for example, a partition 1 and a partition 2. That the data row should be allocated to the partition 1 is determined based on the timestamp in the data row. The partition 1 includes a plurality of small parts, for example, a small part 1, a small part 2, and a small part 3. The small parts belong to the second layer cache, and each small part includes a plurality of CUs and a CU description file. For understanding a relationship between the small part and the CU, refer to FIG. 5E. Details are not described herein again. The small parts are then combined into a large part based on time ranges, for example, the small part 1, the small part 2, and the small part 3 are combined into a large part. For understanding the process, refer to FIG. 5F. Then, the large part is flushed to the disk, that is, the data storage.

In addition, in this embodiment of this application, data in a plurality of CUs in the merged data set is compressed, and the plurality of CUs are compressed, to obtain a compressed merged data set. The compressed merged data set is written into the data storage. A double compression mode can improve a compression ratio and further improve a throughput of the database system.

Figure 7A:
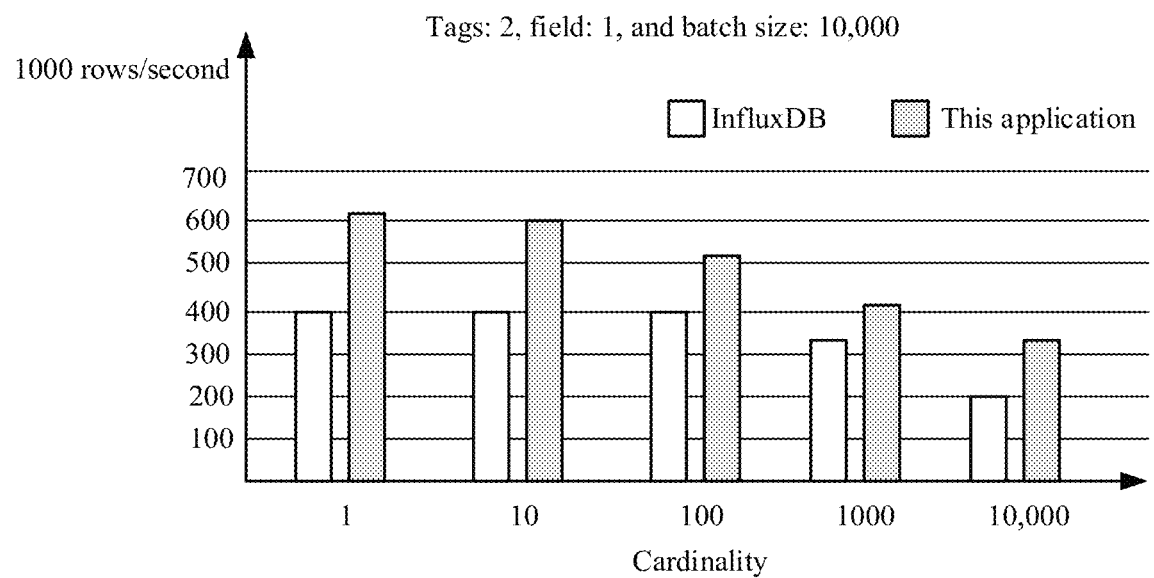
FIG. 7A is an effect comparison diagram according to an embodiment of this application.
Figure 7B:
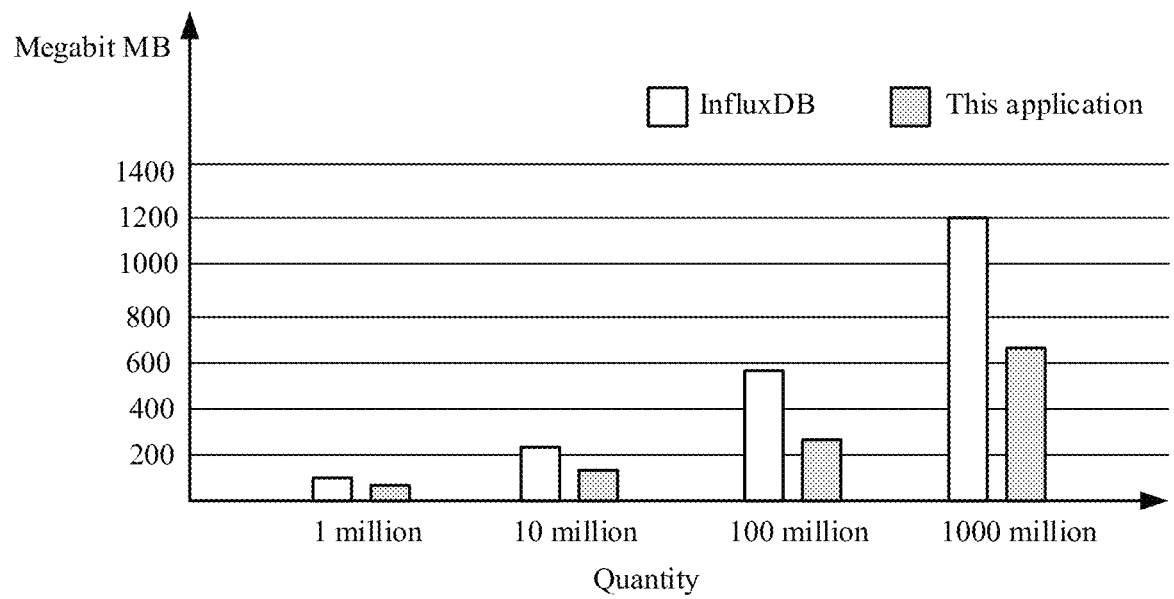
FIG. 7B is another effect comparison diagram according to an embodiment of this application.

In some embodiments of this application, storage performance of a database, for example, a throughput and data compression performance, are far better than that of a time series database in the conventional technology. FIG. 7A and FIG. 7B are bar charts generated based on experimental data recorded by an engineer. It can be seen from a throughput comparison diagram shown in FIG. 7A that, when a first parameter group has two parameters (a quantity of tags is 2), a second parameter group has one indicator (a quantity of fields is 1), and 10,000 pieces of data (a batch size is 10,000 pieces of time series data) are injected in a batch, a comparison with cardinalities of 1, 10, 100, 1000, and 10,000 show that the time series data injection solution provided in this application improves a throughput of a database system by at least 30% compared with that of the existing InfluxDB. It can be seen from a compression performance comparison diagram shown in FIG. 7B that, when quantities are 1 million, 10 million, 100 million, and 1000 million, the time series data injection solution provided in this application improves data compression performance by at least 50% compared with that of the InfluxDB.

The foregoing describes a time series data injection process. The following describes a time series data query method provided in an embodiment of this application with reference to the accompanying drawings.

Figure 8:
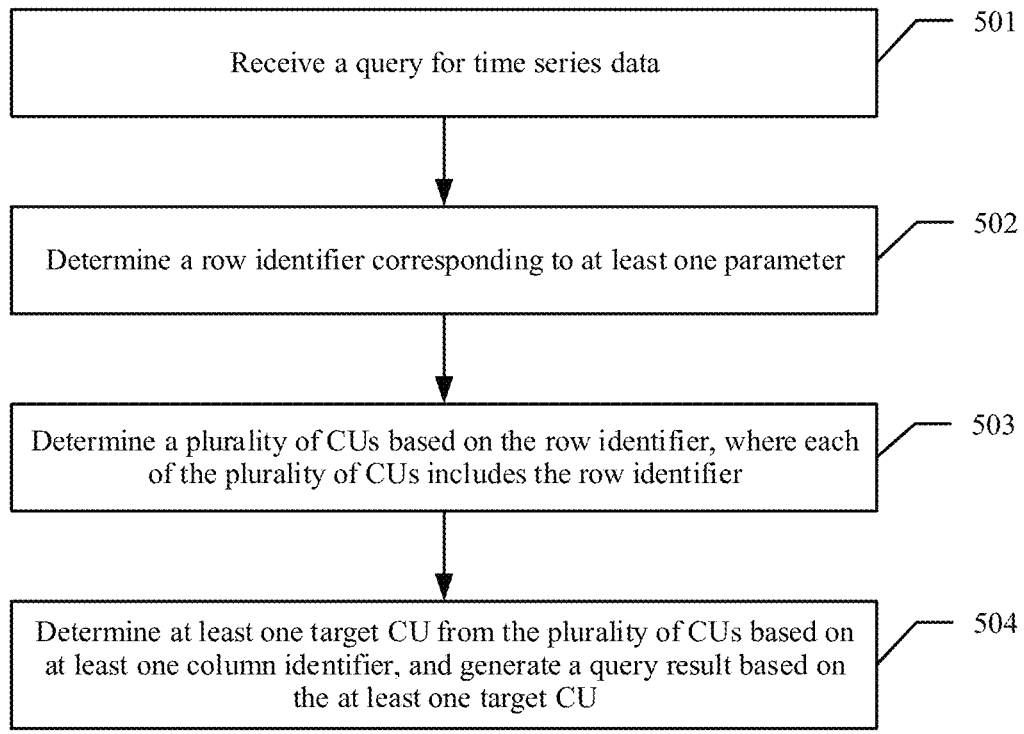
FIG. 8 is a schematic diagram of an embodiment of a time series data query method according to an embodiment of this application.

As shown in FIG. 8, an embodiment of a time series data query method according to an embodiment of this application includes the following operations.

501: Receive a query for time series data.

The query includes at least one parameter identifying a data source that generates the time series data and at least one column identifier. The at least one column identifier indicates at least one target column. The at least one target column includes an indicator indicating at least one attribute of the data source.

For definitions and relationships of the at least one parameter identifying the data source that generates the time series data, the attribute, the indicator, and the like, refer to related content in the foregoing embodiments for time series data injection. Details are not described herein again.

502: Determine a row identifier corresponding to the at least one parameter.

This operation may be: determining an index value based on the at least one parameter; and determining, based on the index value and a correspondence between the index value and a row identifier, the row identifier corresponding to the index value.

For understanding the process, refer to operations 301 and 303 in the corresponding descriptions of the embodiment shown in FIG. 4.

503: Determine a plurality of CUs based on the row identifier, where each of the plurality of CUs includes the row identifier.

Figure 5D:
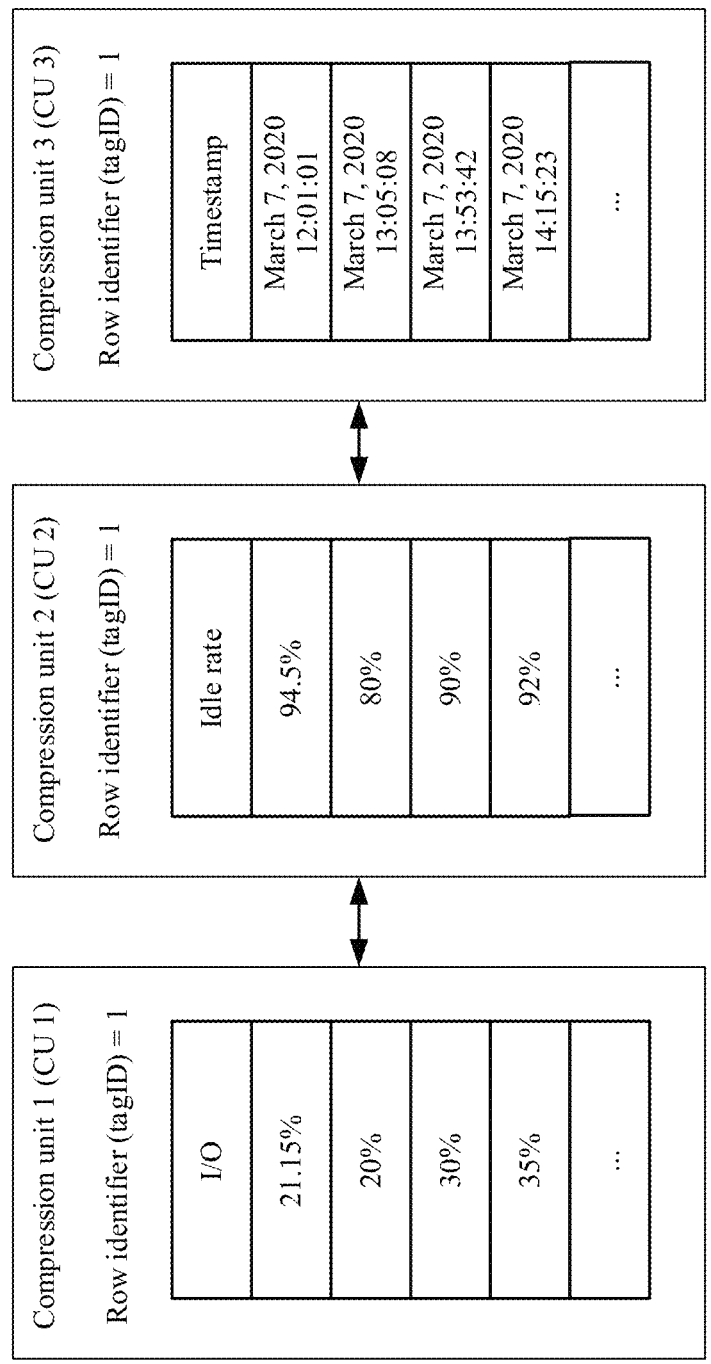
FIG. 5D is a schematic diagram of another example scenario according to an embodiment of this application.

For understanding a relationship between the row identifier and the plurality of CUs, refer to FIG. 5C and FIG. 5D. For understanding content included in the data row, refer to Table 3.

504: Determine at least one target CU from the plurality of CUs based on the at least one column identifier, and generate a query result based on the at least one target CU.

The column identifier may be represented by using a number. For example, in Table 3, if the column identifier is 1, the corresponding column is an I/O column. Alternatively, if the column identifier is 2, the corresponding column is an idle rate column. Certainly, the column identifier may alternatively be represented in another manner. This is not limited in this application.

It should be noted that the at least one column identifier, the at least one target column, the indicator of the at least one attribute, and the at least one target CU are in a one-to-one correspondence.

In a possible embodiment, generating the query result based on the at least one target CU includes: generating the query result based on the indicator of the at least one attribute in the at least one target CU and the at least one parameter.

The indicator of the at least one attribute in the at least one target CU and the at least one parameter may be combined into corresponding time series data based on a structure during time series data injection, and then the time series data is returned to the client.

In some embodiments the at least one parameter identifying the data source that generates the time series data, to find the plurality of CUs corresponding to the row identifier in a columnar storage, and then determine a target CU from the plurality of CUs based on the column identifier. It can be learned that the target CU of the column corresponding to the column identifier can be quickly found by querying based on the at least one parameter identifying the data source that generates the time series data and the column identifier. The query result is generated and returned to a client. This improves time series data query efficiency.

In an embodiment, the query further includes a query time. The method further includes: determining a target partition corresponding to a first time range including the query time, where the target partition includes a plurality of merged data sets; determining a first merged data set from the plurality of merged data sets, where a second time range corresponding to the first merged data set includes the query time, and the first merged data set includes a plurality of CUs; determining a plurality of first CUs from the plurality of CUs included in the first merged data set, where a third time range corresponding to the first CU includes the query time, the first time range includes the second time range, and the second time range includes the third time range; and correspondingly, determining, from the plurality of first CUs, the plurality of CUs corresponding to the row identifier.

Figure 9A:
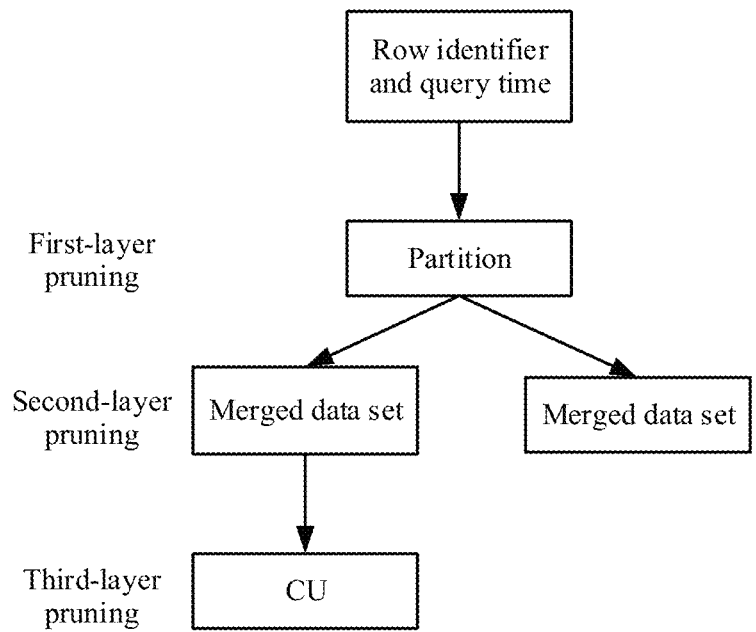
FIG. 9A is a schematic diagram of a further scenario according to an embodiment of this application.

This process may also be understood as a three-layer pruning process. As shown in FIG. 9A, a corresponding partition is determined based on the query time. A query range is further narrowed down to a part, and then the query range is further narrowed down to the CU. The query range is narrowed down by using three levels, without searching a large amount of data. This improves data query efficiency.

Figure 9B:
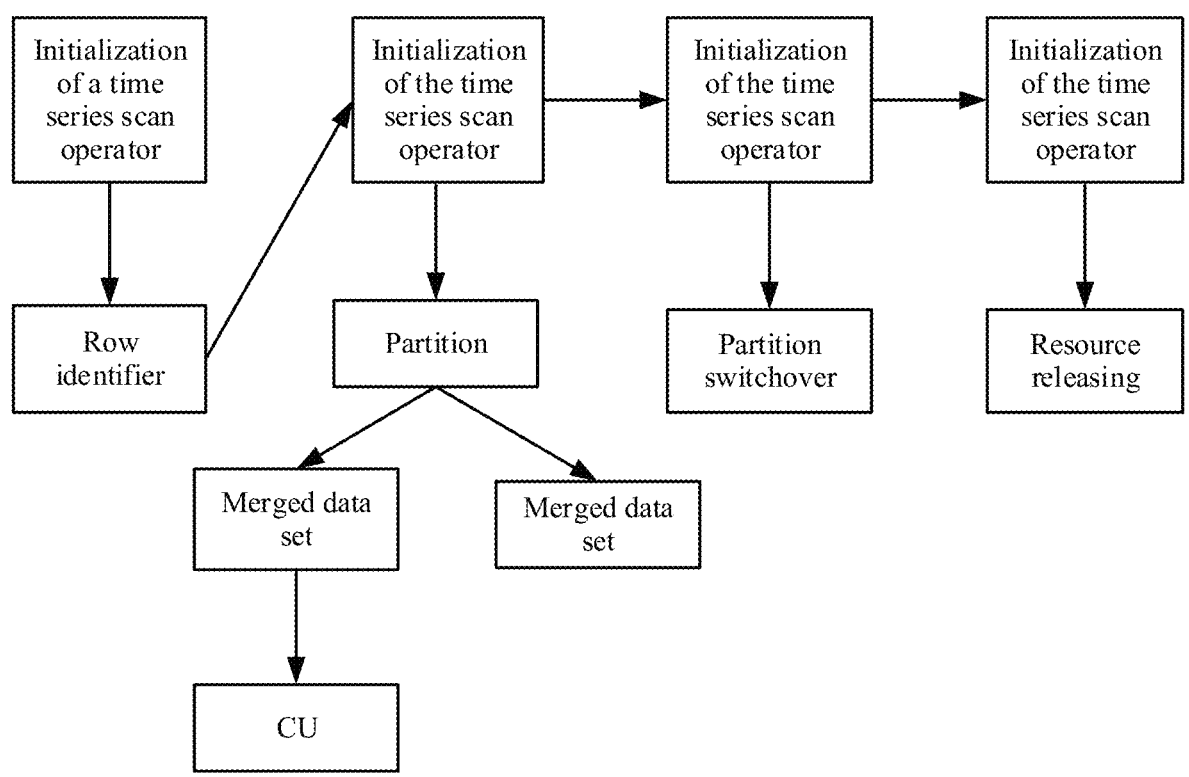
FIG. 9B is a schematic diagram of a still further scenario according to an embodiment of this application.

In a database system provided in this embodiment of this application, in a process of querying time series data, a query plan is first generated based on a query, and then the execution plan is submitted to a scan operator, and then the scan operator invokes a storage interface to query corresponding time series data. For understanding the entire query process, refer to FIG. 9B. The process shown in FIG. 9B includes the following operations.

1. Initialization of a Time Series Scan Operator

When the time series scan operator is initialized, a scanning state (TsStoreScanState) object is created. The object implements interaction between an execution layer and a storage layer. The object stores context information, including at least one parameter identifying a data source that generates time series data, a column identifier, a query time, and the like. During initialization, a tagId is queried based on the at least one parameter identifying the data source that generates the time series data, and is stored in the scanning state object.

2. Execution of the Time Series Scan Operator

The execution of the time series scan operator is driven by an upper-layer partition operator. The storage layer provides an interface. A search link global search (TsStoreSearch) →partition search (PartitionSearch)→data set search (PartSearch) is used to implement data scanning. As a minimum search unit, PartSearch is used to complete data scanning. An example process is as follows: A CU description file (cudesc) is scanned based on a tagId set in a TsStoreScanState object. A corresponding column identifier (columnId) is found. Data in a corresponding target CU is obtained based on the columnId and returned. After the CU is obtained, a vector row (VectorBatch) is obtained through concatenation and given to the time series scan operator.

3. Reconfiguration of the Time Series Scan Operator

After the upper-layer partition operator scans data in a current partition, a reconfiguration interface of a lower-layer operator is called to notify a partition switchover. The reconfiguration of the time series scan operator reconfigures the PartitionSearch and PartSearch to perform the partition switchover.

4. The Execution of the TsStoreScan Operator Ends.

After all data in a time series is scanned, an operator end interface of TsStoreScan is called to release related resources.

Figure 9C:
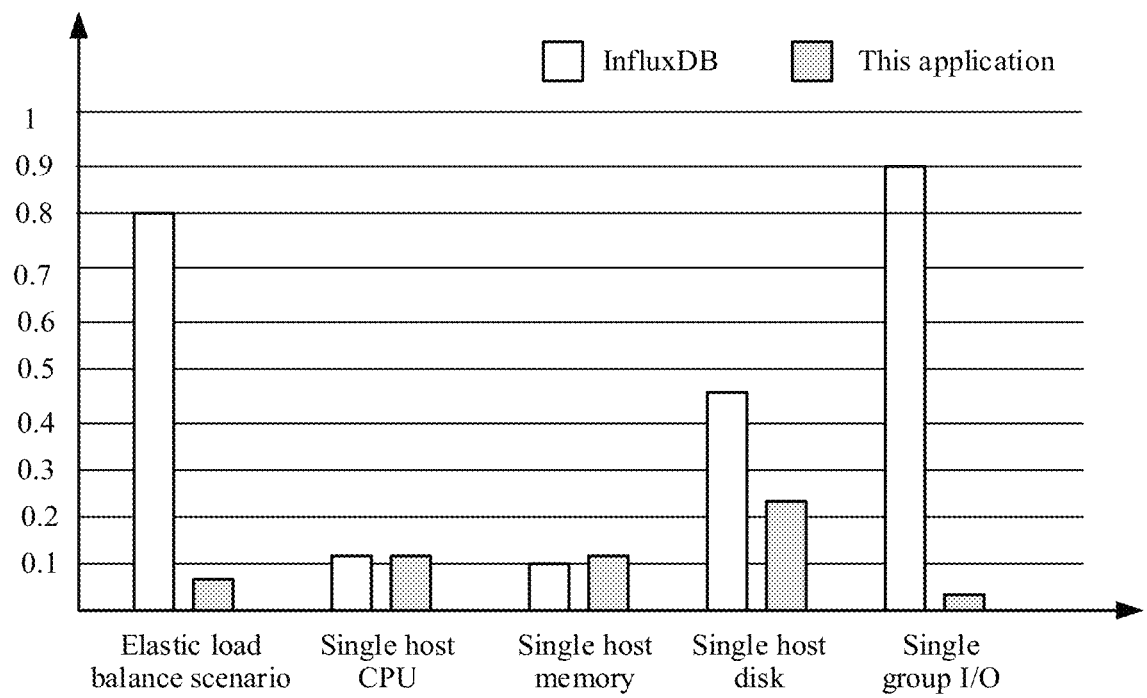
FIG. 9C is still another effect schematic diagram according to an embodiment of this application.

In some embodiments of this application, query performance of a database is far better than that of a time series database in the conventional technology. FIG. 9C is a bar chart generated based on experimental data recorded by an engineer. It can be seen from a comparison diagram of normalized query delays of an InfluxDB and a GaussDB TSDB in a basic resource monitoring scenario of a consumer cloud shown in FIG. 9C, for example, in an elastic load balance (ELB) scenario, when, for example, a single group I/O has a high scattering density and there is a large data amount, the database system (GaussDB TSDB) according to this embodiment of this application increases query delay performance two folds compared with that of the InfluxDB.

The time series data injection method and the time series data query method are described in the foregoing embodiments. The following describes a time series data injection apparatus and a time series data query apparatus provided in embodiments of this application with reference to the accompanying drawings.

Figure 10:
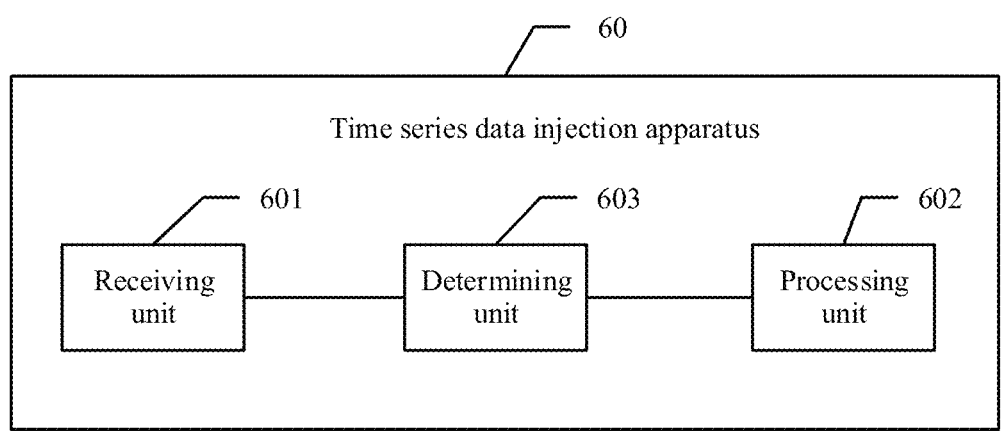
FIG. 10 is a schematic diagram of an embodiment of a time series data injection apparatus according to an embodiment of this application.

As shown in FIG. 10, an embodiment of a time series data injection apparatus 60 according to an embodiment of this application includes:

a receiving unit 601, configured to receive time series data, where the time series data includes at least one parameter identifying a data source that generates the time series data, an indicator indicating at least one attribute of the data source, and a timestamp, and the timestamp indicates a time point when the indicator is generated; and a processing unit 602, configured to: store a first parameter group in a row storage format, where the first parameter group includes the at least one parameter identifying the data source that generates the time series data; and store a second parameter group in a columnar storage format, where the second parameter group includes the indicator indicating at least one attribute of the data source and the timestamp.

In this embodiment of this application, the at least one parameter that does not change with time and that identifies the data source that generates the time series data is stored in the row storage format, and the indicator of the attribute that changes with time and the corresponding timestamp are stored in the columnar storage format. Because the at least one parameter identifying the data source that generates the time series data does not change with time, for other time series data of the data source, the at least one parameter does not need to be repeatedly stored. Storage of the at least one parameter by row saves storage space, and improves storage performance of the database system. In addition, because the at least one parameter needs to be read during query, and the at least one parameter is stored in the row storage format, the at least one parameter can be quickly located during a query without waste of query resources. Columnar storage facilitates to quickly find an indicator of a corresponding queried attribute. Therefore, in some embodiments of this application, time series data is injected in a hybrid row-column storage manner. This improves storage performance of the database, and improves time series data query efficiency.

In some embodiments, the apparatus 60 further includes:

a determining unit 603, configured to: determine a row identifier based on the first parameter group, and generate a data row based on the row identifier, the at least one indicator, and the timestamp.

The processing unit 602 is configured to: store the at least one indicator included in the data row into at least one compression unit CU, where the at least one indicator is in a one-to-one correspondence with the at least one CU, and each CU in the at least one CU includes the row identifier; and store the timestamp into a CU, where the CU storing the timestamp includes the row identifier.

In some embodiments, the processing unit 602 is configured to store the first parameter group and the row identifier in a row storage format.

In some embodiments, the determining unit 603 is configured to: determine an index value corresponding to the at least one parameter in the first parameter group; and query a global cache to obtain a row identifier corresponding to the index value, where the global cache stores a correspondence between the index value and the row identifier.

In some embodiments, the determining unit 603 is configured to: determine an index value corresponding to the plurality of parameters in the first parameter group; and allocate the row identifier to the index value, and store a correspondence between the index value and the row identifier into a global cache.

In some embodiments, the at least one CU storing the at least one indicator and the CU storing the timestamp are located in a partition corresponding to a first time range. The time point indicated by the timestamp is within the first time range.

In some embodiments, the partition includes a plurality of data sets. The data sets correspond to time ranges that do not completely overlap with each other. The at least one CU and the CU storing the timestamp are located in a same data set. The time point indicated by the timestamp is within a time range corresponding to the same data set.

In some embodiments, the processing unit 602 is further configured to: merge at least two data sets in the plurality of data sets to obtain a merged data set, where a second time range corresponding to the merged data set includes time ranges corresponding to the at least two data sets, and the second time range is included in the first time range; and writing the merged data set into a data storage.

In some embodiments, the processing unit 602 is further configured to: compress data in a plurality of CUs in the merged data set, and compress the plurality of CUs, to obtain a compressed merged data set; and write the compressed merged data set into the data storage.

For understanding the foregoing related content of the time series data injection apparatus 60, refer to the related content in the foregoing time series data injection method embodiment. Details are not described herein again.

Figure 11:
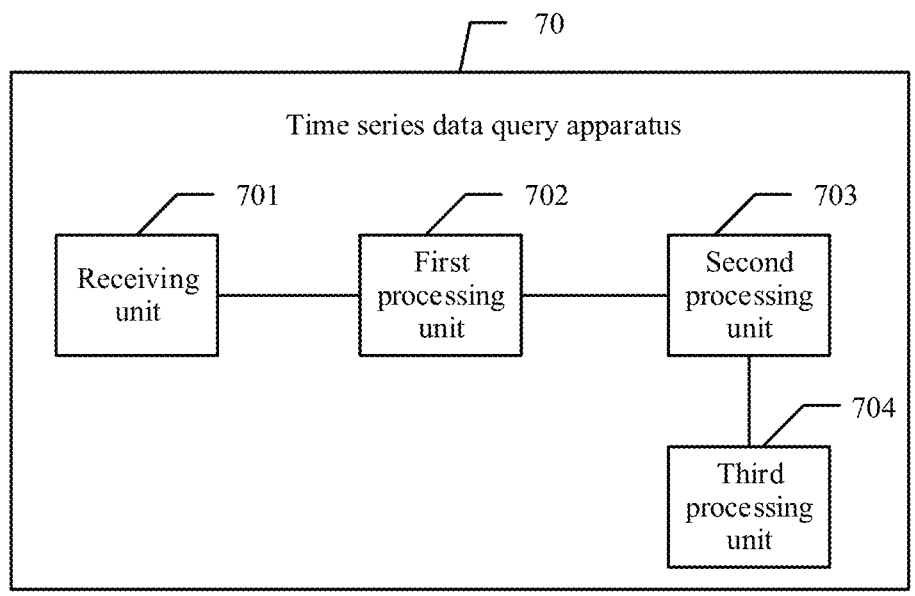
FIG. 11 is a schematic diagram of an embodiment of a time series data query apparatus according to an embodiment of this application.

As shown in FIG. 11, an embodiment of a time series data query apparatus 70 according to an embodiment of this application includes:

a receiving unit 701, configured to receive a query for time series data, where the query includes at least one parameter identifying a data source that generates the time series data and at least one column identifier, the at least one column identifier indicates at least one target column, and the at least one target column includes an indicator indicating at least one attribute of the data source;

a first processing unit 702, configured to determine a row identifier corresponding to the at least one parameter received by the receiving unit 701;

a second processing unit 703, configured to determine a plurality of CUs based on the row identifier determined by the first processing unit 702, where each of the plurality of CUs includes the row identifier; and a third processing unit 704, configured to: determine, based on the at least one column identifier, at least one target CU from the plurality of CUs determined by the second processing unit 703, where each target CU corresponds to one target column; and generate a query result based on the at least one target CU.

In some embodiments of this application, the corresponding row identifier may be determined based on the at least one parameter identifying the data source that generates the time series data, to find the plurality of CUs corresponding to the row identifier in a columnar storage, and then determine a target CU from the plurality of CUs based on the column identifier. It can be learned that the column to be queried can be quickly found by querying based on the at least one parameter identifying the data source that generates the time series data and the column identifier. This improves time series data query efficiency.

In some embodiments, the third processing unit 704 is configured to generate the query result based on the indicator of the at least one attribute in the at least one target CU and the at least one parameter.

In some embodiments, the query further includes a query time, and the first processing unit 702 is further configured to: determine a target partition corresponding to a first time range including the query time, where the target partition includes a plurality of merged data sets; determine a first merged data set from the plurality of merged data sets, where a second time range corresponding to the first merged data set includes the query time, and the first merged data set includes a plurality of CUs; and determine a plurality of first CUs from the plurality of CUs included in the first merged data set, where a third time range corresponding to the first CU includes the query time, the first time range includes the second time range, and the second time range includes the third time range.

The second processing unit 703 is configured to determine, from the plurality of first CUs, the plurality of CUs corresponding to the row identifier.

In some embodiments, the first processing unit 702 is configured to: determine an index value corresponding to the at least one parameter; and query a global cache to obtain a row identifier corresponding to the index value, where the global cache stores a correspondence between the index value and the row identifier.

For understanding the foregoing related content of the time series data query apparatus 70, refer to the related content in the foregoing time series data query method embodiment. Details are not described herein again.

Figure 12:
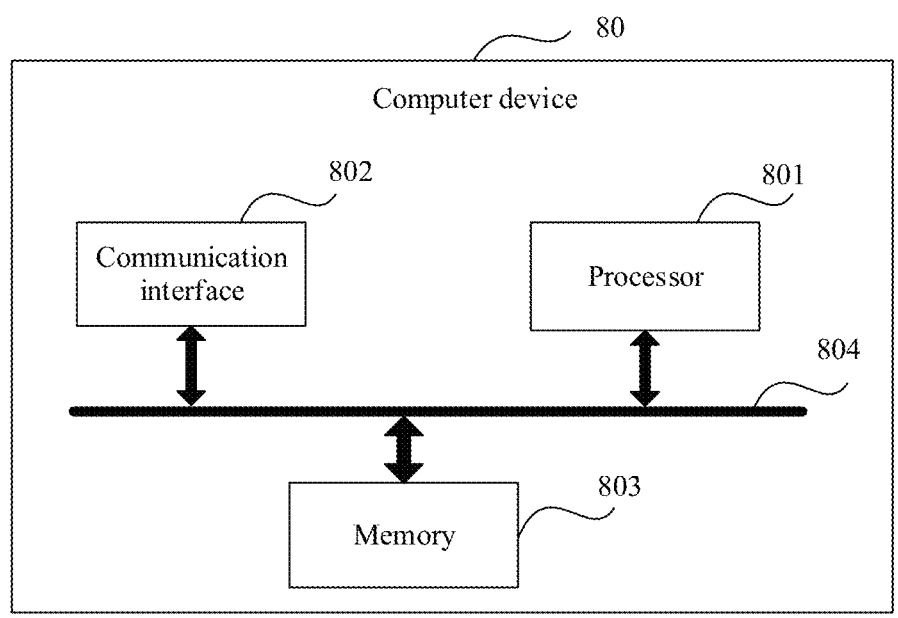
FIG. 12 is a schematic diagram of a structure of a computer device according to an embodiment of this application.

FIG. 12 is a schematic diagram of a possible logical structure of a computer device 80 in the foregoing embodiments according to an embodiment of this application. The computer device 80 may be a time series data injection apparatus or a time series data query apparatus. The computer device 80 includes a processor 801, a communication interface 802, a memory 803, and a bus 804. The processor 801, the communication interface 802, and the memory 803 are connected to each other by using the bus 804. In this embodiment of this application, the processor 801 is configured to control and manage an action of the time series data injection apparatus or the time series data query apparatus 80. For example, the processor 801 is configured to perform operations related to determining in FIG. 3 to FIG. 9C, for example, operations 202 to 203, operations 301 to 305, operations 401 to 406, and operations 502 to 504. The communication interface 802 is configured to support the computer device 80 in performing communication. For example, the communication interface 802 may perform operations related to receiving or sending in the foregoing method embodiments. The memory 803 is configured to store program code and data of a database server.

The processor 801 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 804 may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 12, but this does not mean that there is only one bus or only one type of bus.

Figure 13:
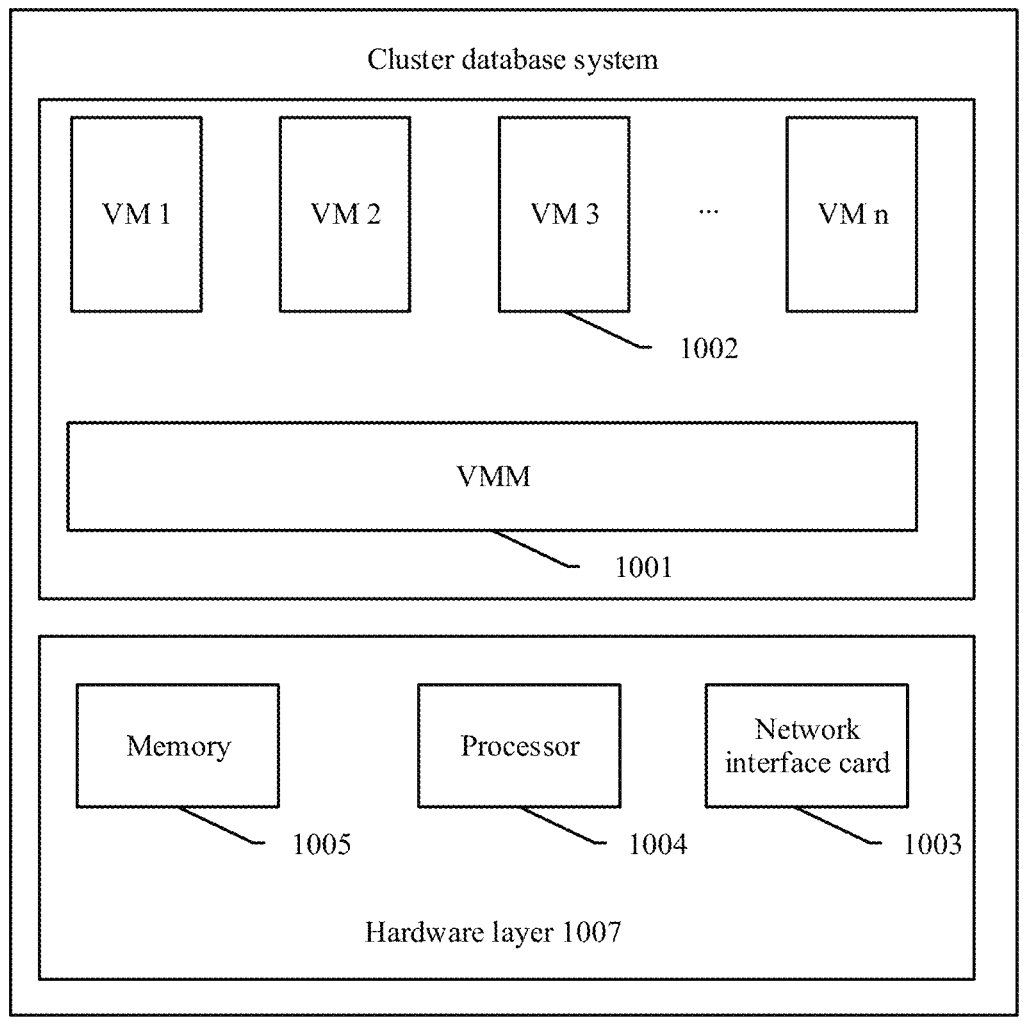
FIG. 13 is a schematic diagram of another structure of a database system according to an embodiment of this application.

Refer to FIG. 13. An embodiment of this application further provides a distributed database system, including a hardware layer 1007, a virtual machine monitor (VMM) 1001 running at the hardware layer 1007, and a plurality of virtual machines 1002. One virtual machine may be used as a data node of the distributed database system. In some embodiments, one virtual machine may be further specified as a coordinator node.

Specifically, the virtual machine 1002 is a virtual computer simulated on a common hardware resource by using virtual machine software. An operating system and an application program may be installed on the virtual machine, and the virtual machine may further access a network resource. For application programs running on the virtual machines, the virtual machines work like real computers.

The hardware layer 1007 is a hardware platform for virtual environment running, and may be obtained by abstracting hardware resources of one or more physical machines. The hardware layer may include a plurality of types of hardware, for example, a processor 1004 (such as a CPU) and a memory 1005, and may further include a network interface card 1003 (such as an RDMA network interface card), a high-speed/low-speed input/output (I/O) device, and another device with a specific processing function.

The virtual machine 1002 runs an executable program based on the VMM and a hardware resource provided by the hardware layer 1007, to implement some or all functions of the time series data injection apparatus or the time series data query apparatus in the related embodiments in FIG. 3 to FIG. 9C. For brevity, details are not described herein again.

Further, the distributed database system may further include a host. The host, serving as a management layer, is configured to manage and allocate hardware resources, present a virtual hardware platform for the virtual machine, and implement scheduling and isolation for the virtual machine. The host may be a virtual machine monitor (VMM) or a combination of a VMM and one privileged virtual machine. The virtual hardware platform provides various hardware resources for each virtual machine running on the virtual hardware platform. For example, the virtual hardware platform provides a virtual processor (such as a VCPU), a virtual memory, a virtual disk, and a virtual network interface card. The virtual disk may correspond to a file or a logical block device of the host. A virtual machine runs on a virtual hardware platform that is prepared by the host for the virtual machine, and one or more virtual machines run on the host. The VCPU of the virtual machine 1002 executes an executable program stored in a virtual memory corresponding to the VCPU, to implement or execute the method operations described in the foregoing method embodiments of this application. For example, some or all functions of the time series data injection apparatus or the time series data query apparatus in the embodiments related to FIG. 3 to FIG. 9C are implemented.

In another embodiment of this application, a computer-readable storage medium is further provided. The computer-readable storage medium stores computer-executable instructions. When at least one processor of a device executes the computer-executable instructions, the device performs the time series data injection method or the time series data query method described in the embodiments in FIG. 3 to FIG. 9C.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs the time series data injection method or the time series data query method described in the embodiments in FIG. 3 to FIG. 9C.

In another embodiment of this application, a chip system is further provided. The chip system includes a processor, configured to support a time series data injection apparatus or a time series data query apparatus in implementing the transaction management method described in the embodiments in FIG. 3 to FIG. 9C. In a possible design, the chip system may further include a memory. The memory is configured to store program instructions and data that are utilized by the time series data injection apparatus or the time series data query apparatus. The chip system may include a chip, or may include a chip and another discrete component.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in embodiments of this application, it should be understood that the disclosed system, apparatus, and method may be implemented in other manners. For example, the described apparatus embodiment is merely an example. For example, division into the units is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A time series data injection method, comprising:
   receiving time series data, wherein the time series data comprises:
      at least one parameter identifying a data source that generates the time series data;
      an indicator indicating at least one attribute of the data source; and
      a timestamp indicating a time point when the indicator is generated;
   storing a first parameter group in a row storage format, wherein the first parameter group comprises the at least one parameter identifying the data source that generates the time series data;
   determining a row identifier based on an index value corresponding to the at least one parameter in the first parameter group;
   generating a data row based on the row identifier, the indicator, and the timestamp; and
   storing, in a columnar storage format, a second parameter group comprising the indicator and the timestamp, and storing the indicator into at least one compression unit (CU), wherein the indicator is in a one-to-one correspondence with the at least one CU, and each CU in the at least one CU comprises the row identifier.

2. The method according to claim 1, further comprising:
   storing the timestamp into a CU, wherein the CU storing the timestamp comprises the row identifier.

3. The method according to claim 2, wherein the storing the first parameter group in the row storage format comprises:
   storing the first parameter group and the row identifier in the row storage format.

4. The method according to claim 2, wherein the determining the row identifier based on the first parameter group comprises:
   determining an index value corresponding to the at least one parameter in the first parameter group; and
   querying a global cache to obtain the row identifier corresponding to the index value, wherein the global cache stores a correspondence between the index value and the row identifier.

5. The method according to claim 2, wherein the determining the row identifier based on the first parameter group comprises:
   determining an index value corresponding to the at least one parameter in the first parameter group; and
   allocating the row identifier to the index value, and storing a correspondence between the index value and the row identifier into a global cache.

6. The method according to claim 2, wherein the at least one CU storing the indicator and the CU storing the timestamp are located in a partition corresponding to a first time range, and the time point indicated by the timestamp is within the first time range.

7. The method according to claim 6, wherein the partition comprises a plurality of data sets, the data sets correspond to time ranges that do not completely overlap with each other, the at least one CU and the CU storing the timestamp are located in a same data set, and the time point indicated by the timestamp is within a time range corresponding to the same data set.

8. The method according to claim 7, wherein the method further comprises:
   merging at least two data sets in the plurality of data sets to obtain a merged data set, wherein a second time range corresponding to the merged data set comprises time ranges corresponding to the at least two data sets, and the second time range is comprised in the first time range; and
   writing the merged data set into a data storage.

9. The method according to claim 8, wherein the method further comprises:
   compressing data in a plurality of CUs in the merged data set; and
   compressing the plurality of CUs to obtain a compressed merged data set, and
   wherein the writing the merged data set into the data storage comprises writing the compressed merged data set into the data storage.

10. A database system, comprising a coordinator node and a data node communicatively connected to the coordinator node, wherein
    the coordinator node is configured to receive time series data from a client; and
    the data node is configured to:
       obtain the time series data from the coordinator node, wherein the time series data comprises:
          at least one parameter identifying a data source that generates the time series data;
          an indicator indicating at least one attribute of the data source; and
          a timestamp indicating a time point when the indicator is generated;
       store a first parameter group in a row storage format, wherein the first parameter group comprises the at least one parameter identifying the data source that generates the time series data;

determine a row identifier based on an index value corresponding to the at least one parameter in the first parameter group;

generate a data row based on the row identifier, the indicator, and the timestamp; and store, in a columnar storage format, a second parameter group comprising the indicator and the timestamp, and store the indicator into at least one compression unit (CU), wherein the indicator is in a one-to-one correspondence with the at least one CU, and each CU in the at least one CU comprises the row identifier.

11. The database system according to claim 10, wherein the data node is further configured to:
store the timestamp into a CU, wherein the CU storing the timestamp comprises the row identifier.

12. The database system according to claim 11, wherein the data node is further configured to store the first parameter group and the row identifier in the row storage format.

13. The database system according to claim 11, wherein the data node is further configured to:
determine an index value corresponding to the at least one parameter in the first parameter group; and
query a global cache to obtain the row identifier corresponding to the index value, wherein the global cache stores a correspondence between the index value and the row identifier.

14. The database system according to claim 11, wherein the data node is further configured to:
determine an index value corresponding to the at least one parameter in the first parameter group; and
allocate the row identifier to the index value, and store a correspondence between the index value and the row identifier into a global cache.

15. The database system according to claim 11, wherein the at least one CU storing the indicator and the at least one CU storing the timestamp are located in a partition corresponding to a first time range, and the time point indicated by the timestamp is within the first time range.

16. The database system according to claim 15, wherein the partition comprises a plurality of data sets, the data sets correspond to time ranges that do not completely overlap with each other, the at least one CU and the CU storing the timestamp are located in a same data set, and the time point indicated by the timestamp is within a time range corresponding to the same data set.

17. The database system according to claim 16, wherein the data node is further configured to:
merge at least two data sets in the plurality of data sets to obtain a merged data set, wherein a second time range corresponding to the merged data set comprises time ranges corresponding to the at least two data sets, and the second time range is comprised in the first time range; and
write the merged data set into a data storage.

18. The database system according to claim 17, wherein the data node is further configured to:
compress data in a plurality of CUs in the merged data set;
compress the plurality of CUs to obtain a compressed merged data set; and
write the compressed merged data set into the data storage.

19. A time series data injection apparatus, wherein the apparatus comprises:
at least one processor; and
one or more memories coupled to the at least one processor and storing programming instructions for execution by the at least one processor to cause the apparatus to:
receive time series data, wherein the time series data comprises:
at least one parameter identifying a data source that generates the time series data;
an indicator indicating at least one attribute of the data source; and
a timestamp indicating a time point when the indicator is generated;
store a first parameter group in a row storage format, wherein the first parameter group comprises the at least one parameter identifying the data source that generates the time series data;
determine a row identifier based on an index value corresponding to the at least one parameter in the first parameter group;
generate a data row based on the row identifier, the indicator, and the timestamp; and
store, in a columnar storage format, a second parameter group comprising the indicator and the timestamp, and store the indicator into at least one compression unit (CU), wherein the indicator is in a one-to-one correspondence with the at least one CU, and each CU in the at least one CU comprises the row identifier.

20. The time series data injection apparatus according to claim 19, wherein the programming instructions, when executed by the at least one processor, further cause the apparatus to:
store the timestamp into a CU, wherein the CU storing the timestamp comprises the row identifier.

* * * * *